(12) United States Patent
Almeida Neves et al.

(10) Patent No.: US 10,560,982 B2
(45) Date of Patent: Feb. 11, 2020

(54) SYSTEMS AND METHODS TO DEPLOY AND CONTROL A NODE IN A NETWORK OF MOVING THINGS

(71) Applicant: Veniam, Inc., Mountain View, CA (US)

(72) Inventors: Filipe Manuel Almeida Neves, Águeda (PT); João Pedro Coelho de Azevedo, Oporto (PT); Rui Miguel Correia e Costa, Sintra (PT)

(73) Assignee: Veniam, Inc., Mountain View, CA (US)

( * ) Notice: Subject to any disclaimer, the term of this patent is extended or adjusted under 35 U.S.C. 154(b) by 197 days.

(21) Appl. No.: 15/720,598

(22) Filed: Sep. 29, 2017

(65) Prior Publication Data

US 2018/0132307 A1    May 10, 2018

Related U.S. Application Data

(60) Provisional application No. 62/420,322, filed on Nov. 10, 2016.

(51) Int. Cl.

| | |
|---|---|
| *H04W 84/00* | (2009.01) |
| *G07C 5/00* | (2006.01) |
| *H04L 29/08* | (2006.01) |
| *H04L 29/06* | (2006.01) |
| *H04W 4/021* | (2018.01) |
| *H04W 4/40* | (2018.01) |
| *H04W 4/38* | (2018.01) |

(52) U.S. Cl.
CPC .......... *H04W 84/005* (2013.01); *G07C 5/008* (2013.01); *H04L 65/102* (2013.01); *H04L 67/1042* (2013.01); *H04L 67/12* (2013.01); *H04W 4/021* (2013.01); *H04W 4/40* (2018.02); *H04W 4/38* (2018.02)

(58) Field of Classification Search
None
See application file for complete search history.

(56) References Cited

U.S. PATENT DOCUMENTS

| | | | | |
|---|---|---|---|---|
| 2002/0091812 | A1* | 7/2002 | Ando | H04L 12/2809 709/223 |
| 2007/0283152 | A1* | 12/2007 | Kudo | H04L 63/0428 713/168 |
| 2007/0286380 | A1* | 12/2007 | Hong | H04L 12/281 379/201.01 |
| 2008/0294997 | A1* | 11/2008 | Weitz | G06Q 10/10 715/742 |
| 2009/0037525 | A1* | 2/2009 | Asahara | B63J 99/00 709/203 |
| 2010/0312600 | A1* | 12/2010 | Motoyama | G06F 3/1218 705/7.35 |

(Continued)

*Primary Examiner* — Nicholas R Taylor
*Assistant Examiner* — Tania M Pena-Santana
(74) *Attorney, Agent, or Firm* — McAndrews, Held & Malloy, Ltd.

(57) ABSTRACT

Communication network architectures, systems and methods for supporting a network of mobile nodes. As a non-limiting example, various aspects of this disclosure provide communication network architectures, systems, and methods for supporting a dynamically configurable communication network comprising a complex array of both static and moving communication nodes (e.g., the Internet of moving things).

24 Claims, 14 Drawing Sheets

(56) References Cited

U.S. PATENT DOCUMENTS

| | | | | |
|---|---|---|---|---|
| 2013/0078964 A1* | 3/2013 | Jin | .................. | H04W 4/16 455/414.1 |
| 2014/0188985 A1* | 7/2014 | Park | .................. | H04L 67/10 709/203 |
| 2019/0090174 A1 | 3/2019 | Rocci et al. | | |

* cited by examiner

SYSTEMS AND METHODS TO DEPLOY AND CONTROL A NODE IN A NETWORK OF MOVING THINGS

CROSS-REFERENCE TO RELATED APPLICATIONS/INCORPORATION BY REFERENCE

This patent application makes reference to, claims priority to, and claims benefit from U.S. Provisional Patent Application Ser. No. 62/420,322, filed on Nov. 10, 2016, and titled "Systems and Methods to Deploy and Control a Node in a Network of Moving Things," which is hereby incorporated herein, by reference, in its entirety. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things, autonomous vehicle networks, etc.). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
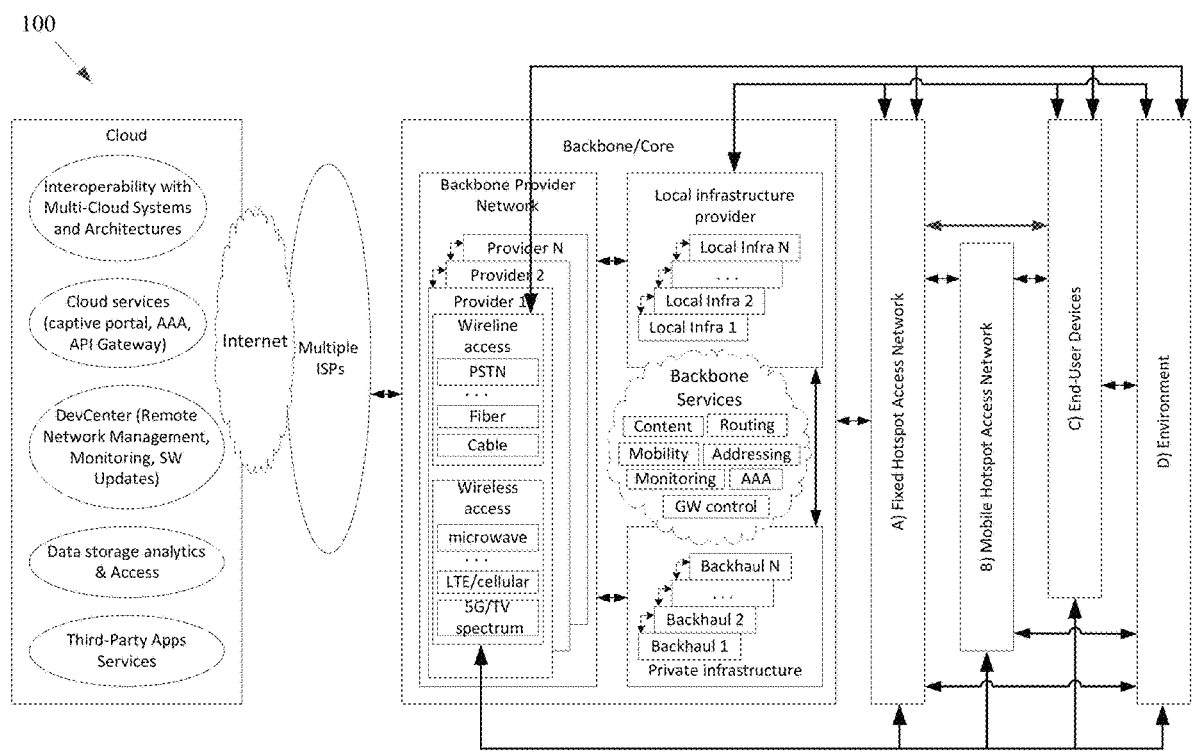
FIG. 1 shows a block diagram of a communication network, in accordance with various aspects of this disclosure.

Various aspects of this disclosure provide communication network architectures, systems and methods for supporting a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things, autonomous vehicle networks, etc.). For example, a communication network implemented in accordance with various aspects of the present disclosure may operate in one of a plurality of modalities comprising various fixed nodes, mobile nodes, and/or a combination thereof, which are selectable to achieve any of a variety of system goals.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example methods, systems, networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
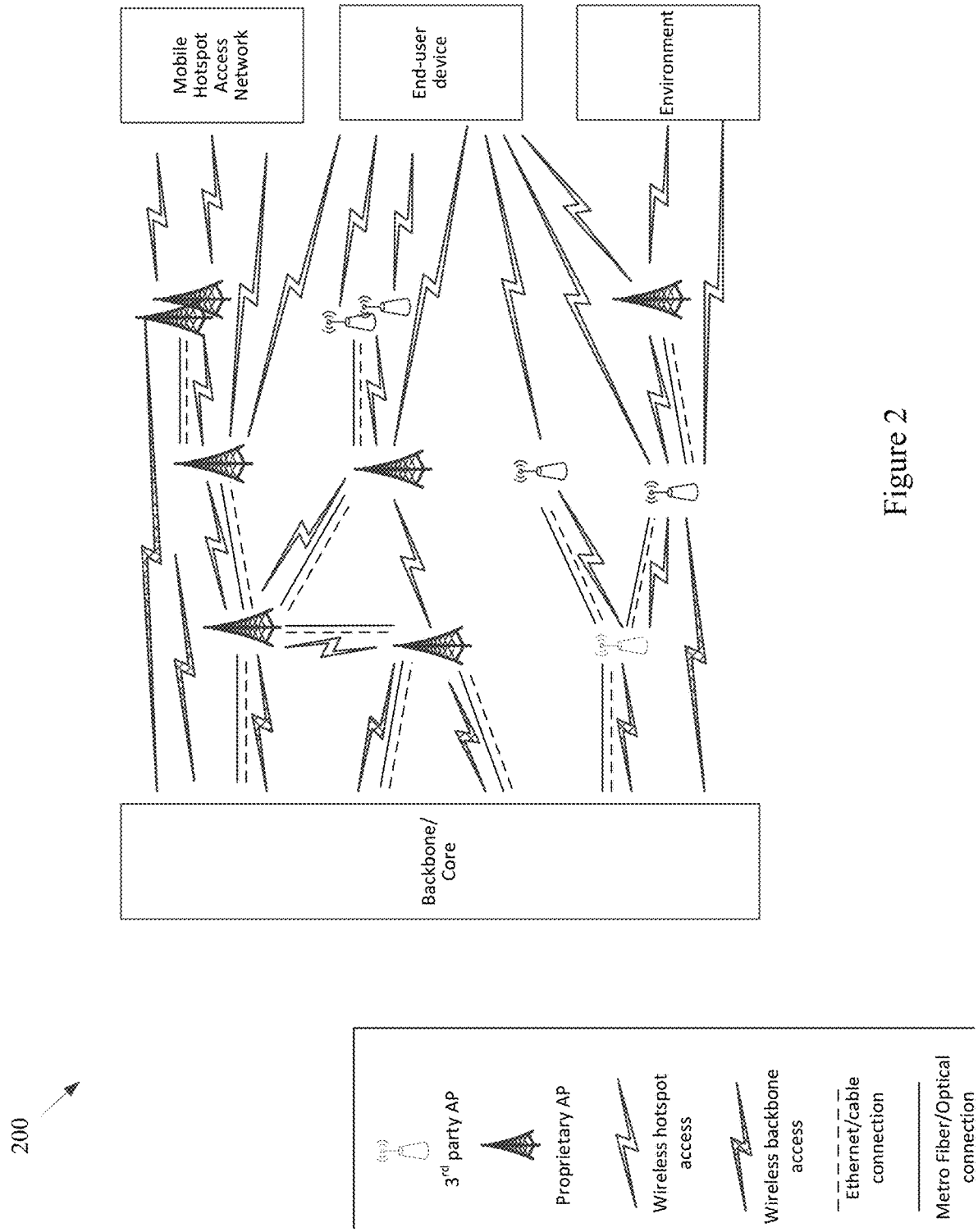
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, systems, networks and/or network components 100, 300, 400, 500-570, and 600, discussed herein n.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
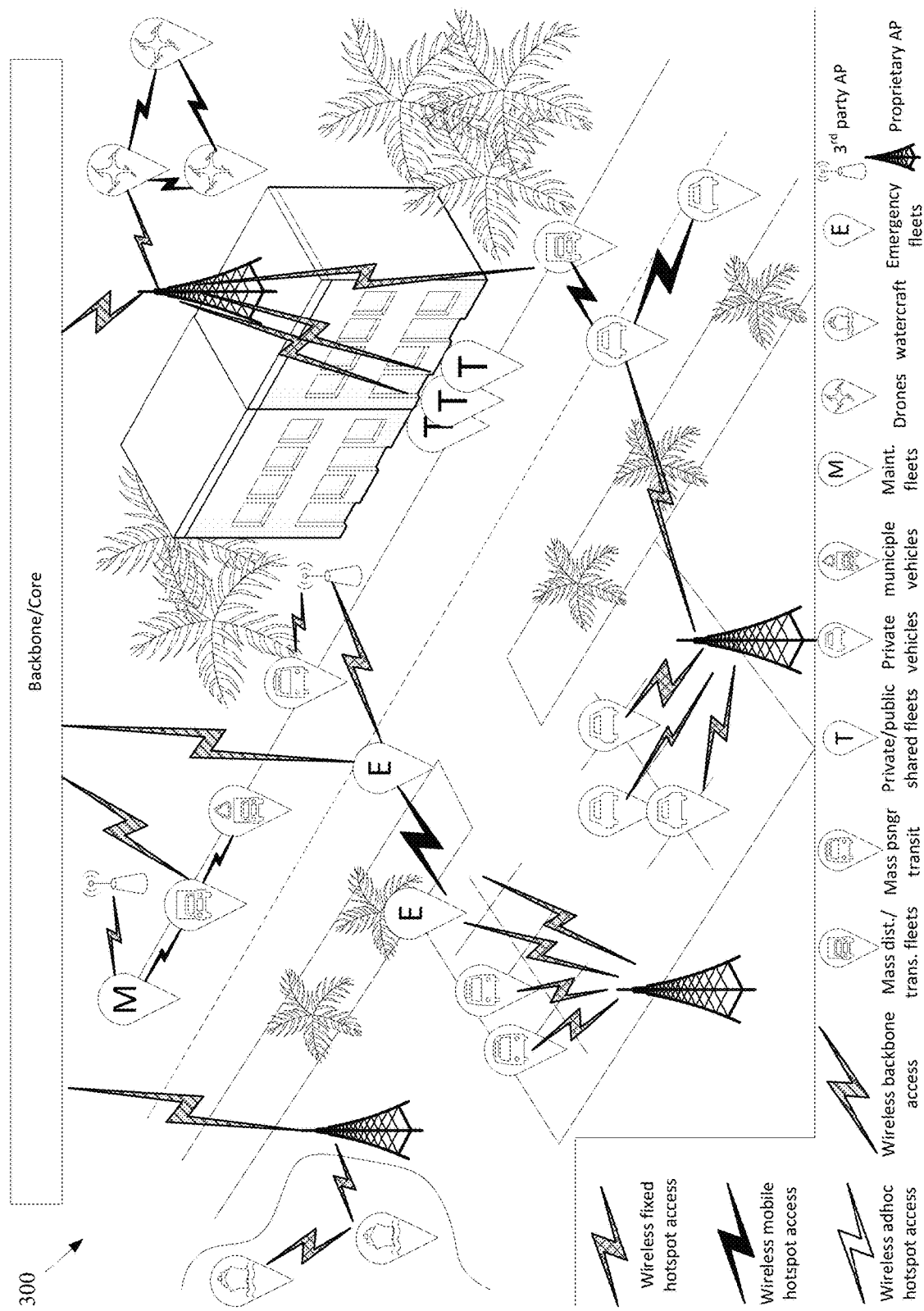
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, systems, networks and/or network components 100, 200, 400, 500-570, and 600, discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
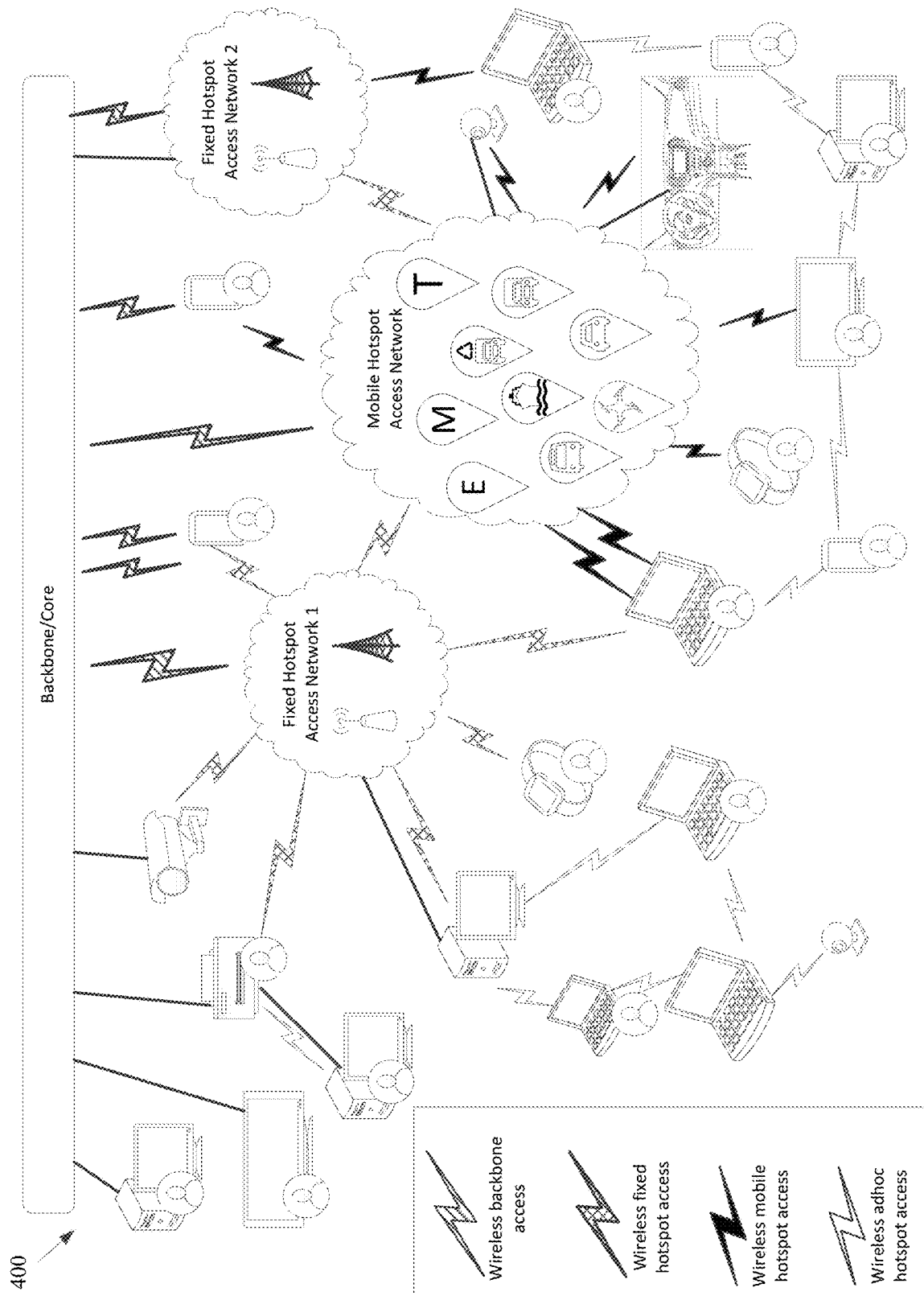
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, systems, networks and/or network components 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
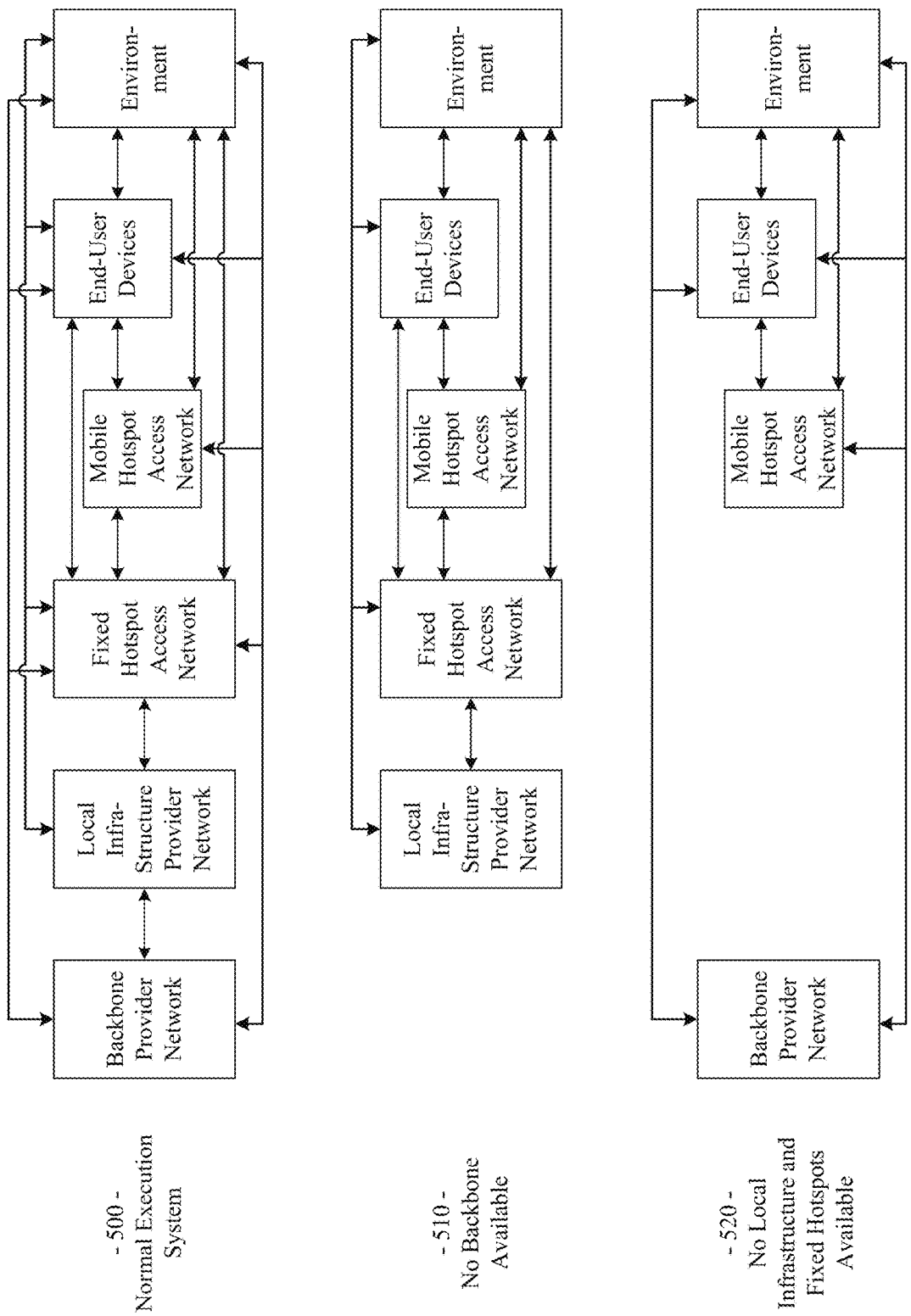
FIGS. 5A-5C show a plurality of network configurations illustrating the flexibility and/or and resiliency of a communication network, in accordance with various aspects of this disclosure.
Figure 5B:
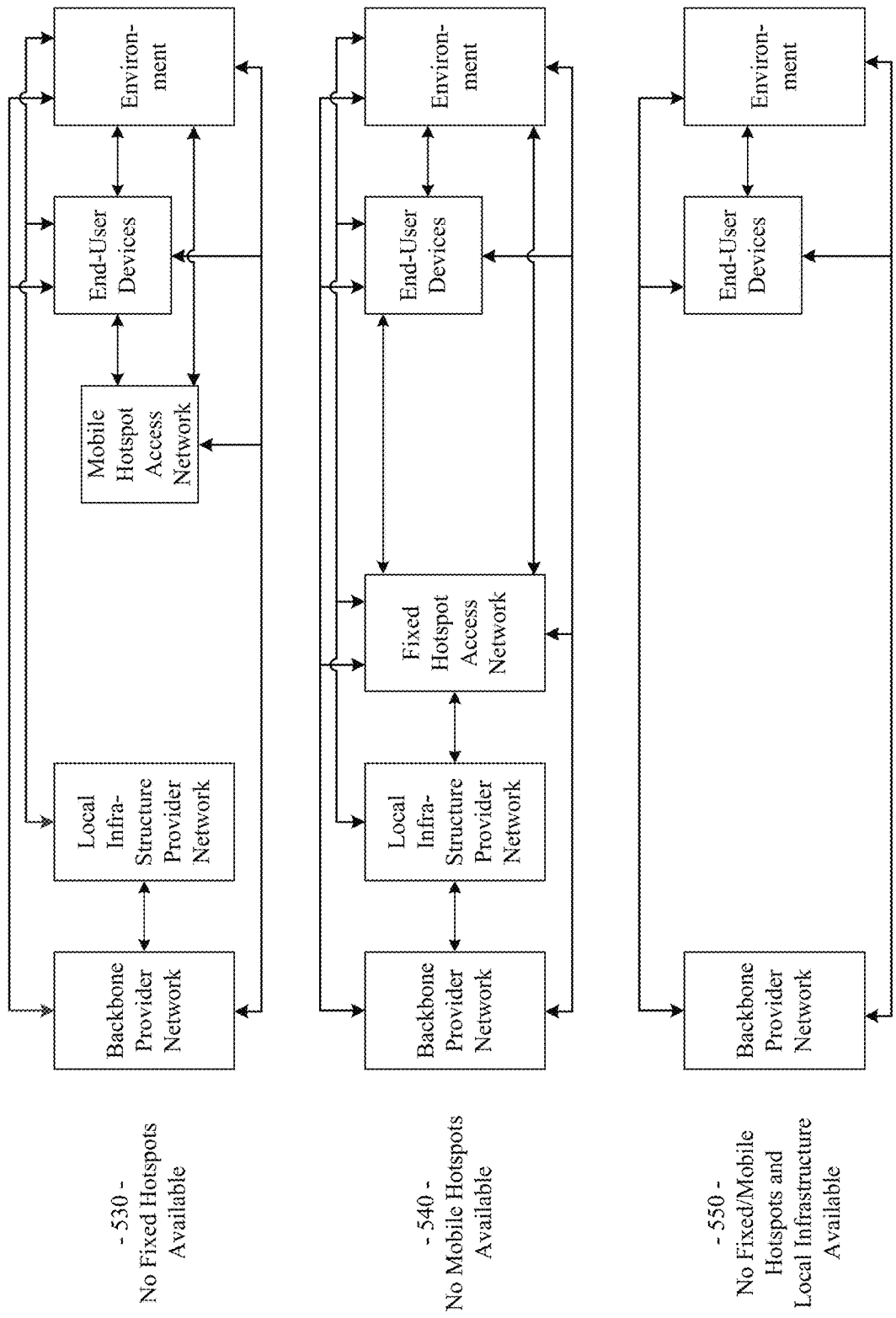
Figure 5C:
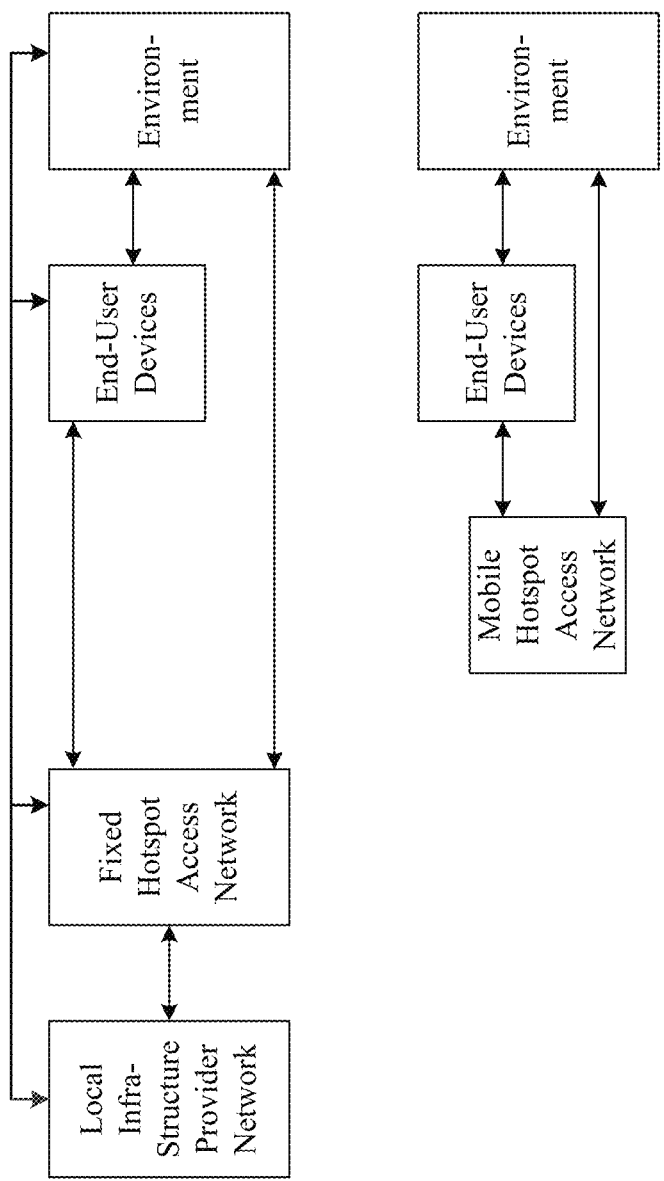

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example methods, systems, networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
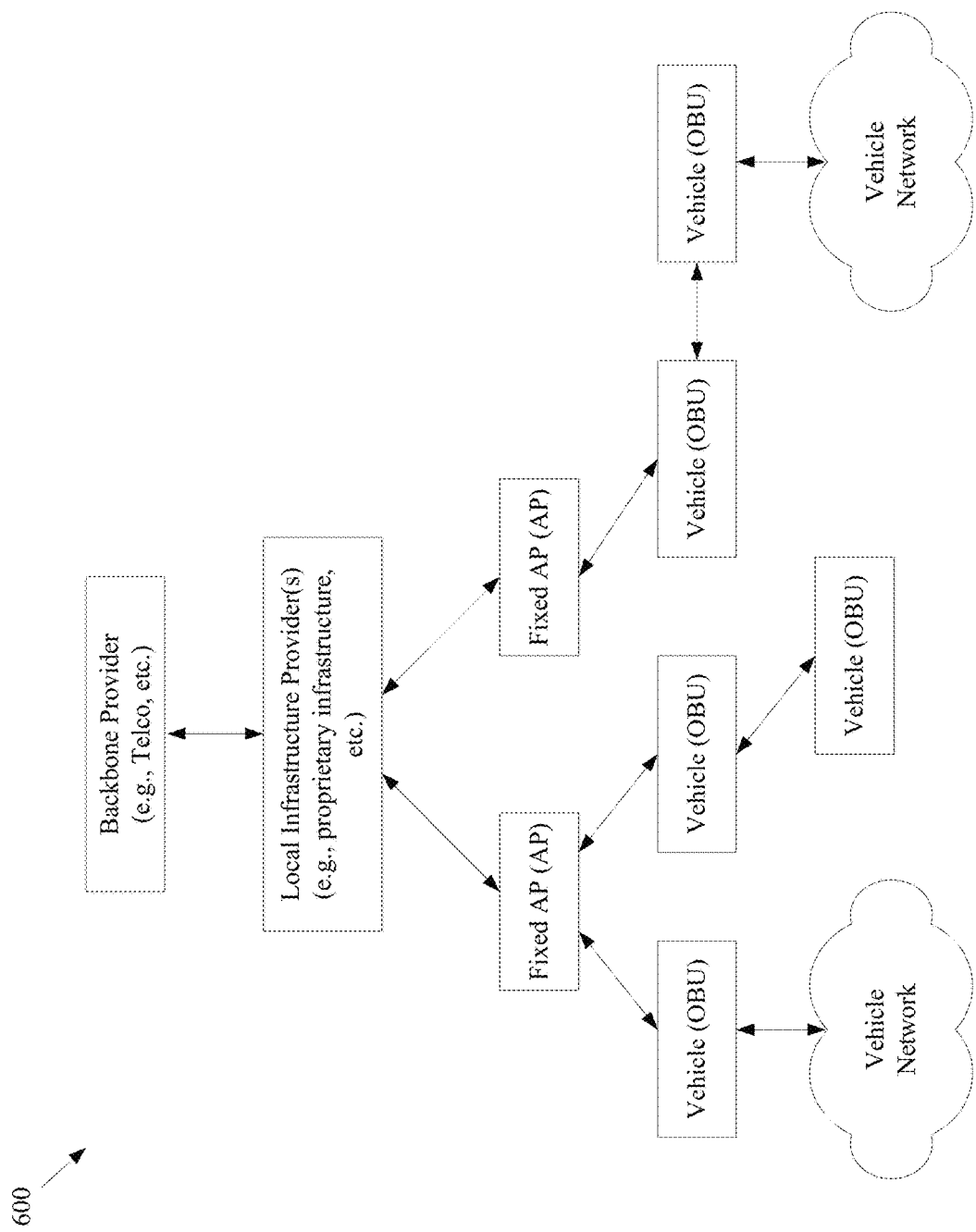
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example methods, systems, networks and/or network components 100, 200, 300, 400, and 500-570, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

Figure 7:
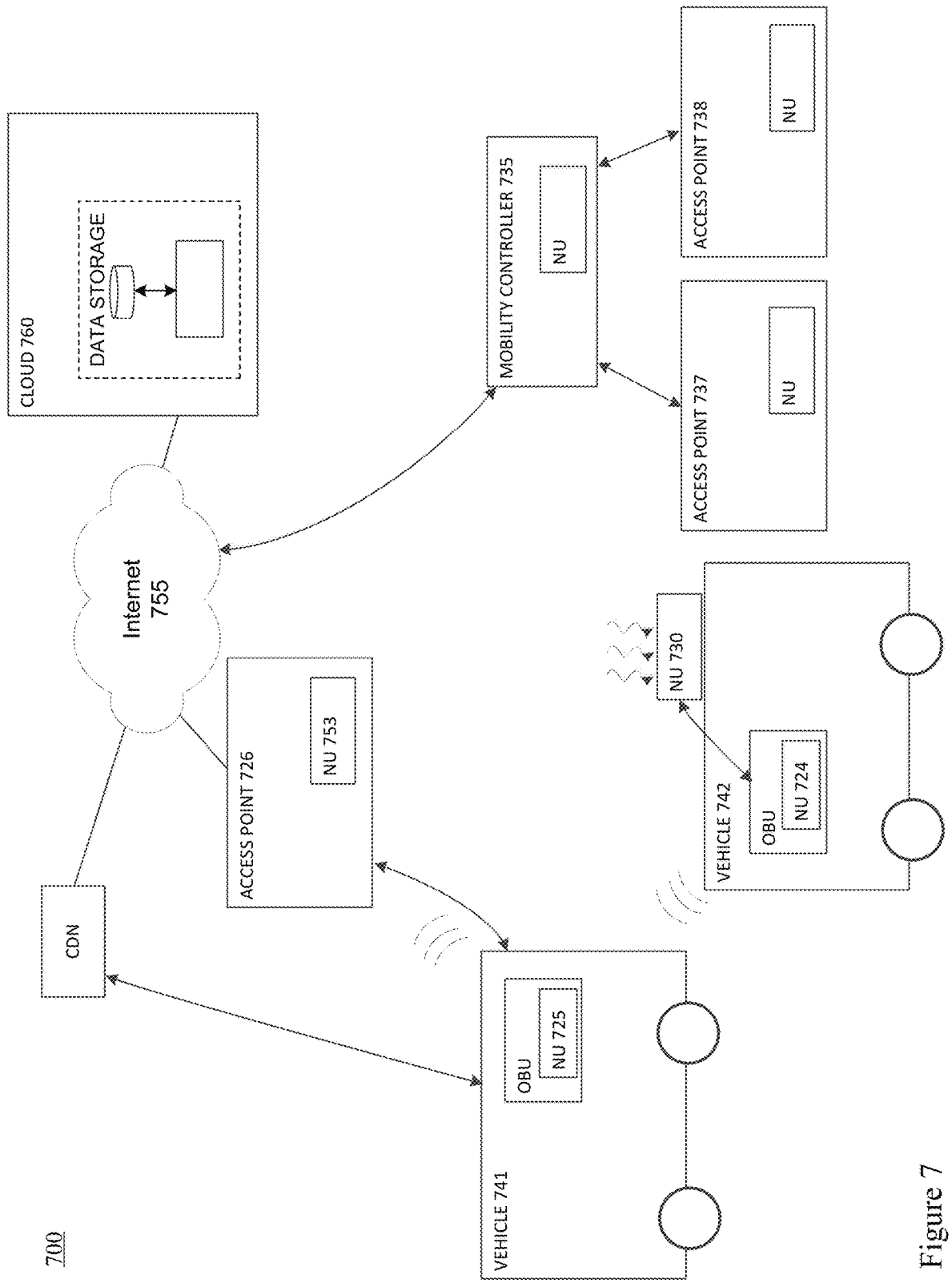
FIG. 7 shows a block diagram of an example communication network, in accordance with various aspects of the present disclosure.

FIG. 7 shows a block diagram of an example communication network 700, in accordance with various aspects of the present disclosure. The example network 700 may, for example, share any or all characteristics with the other example methods, networks, and/or network components 100-800, discussed herein. As illustrated in FIG. 7, the network 700 includes a number of network components (e.g., Cloud 760; vehicles 741, 742; access points 726, 737, 738; and mobility controller 735). The vehicles 741, 742; access points 726, 737, 738; and mobility controller 735 each contain network elements that may be referred to herein as a "network unit" (NU), represented in FIG. 7 as having respective NUs. In the context of a vehicle, the NU may be part of, for example, an OBU, a mobile AP, and an MC/NC, as previously described above.

In accordance with various aspects of the present disclosure, the mobile NUs (e.g., OBUs/MAPs) may have a number of communication interfaces for various wired and wireless communication protocols, and may have access to a number of communication methodologies including, for example, a "DIRECT" communication methodology that involves direct communication with the destination entity, an "OPPORTUNISTIC" communication methodology that communicates with the destination entity only when one specific communication technology is available (e.g., one of Dedicated Short-Range Communication (DSRC) connectivity (e.g., IEEE 802.11p) to a specific access-point, Bluetooth wireless connectivity (e.g., IEEE 802.15.1), or cellular connectively (e.g., Global System for Mobile communication (GSM), Code Division Multiple Access (CDMA), Time Division Multiple Access (TDMA), 4G, 5G, Long Term Evolution (LTE), etc.), and an "EPIDEMIC" communication methodology that may deliver the message to the next available networking neighbor of the entity sending a message. The NUs (e.g., OBUs (MAPs), FAPs) may include, for example, communication interfaces able to provide Wi-Fi (e.g., IEEE-802.11a/b/g/n/ac/ad/agetc.) service to user devices such as, for example, smart phones, tablets, computers, and the like. Additional details of communication methodologies may be found, for example, in U.S. Provisional Patent Application No. 62/272,750, entitled "Systems and Methods for Remote Software Update and Distribution in a Network of Moving Things," filed Dec. 30, 2015; and U.S. Provisional Patent Application No. 62/278,662, entitled "Systems and Methods for Remote Configuration Update and Distribution in a Network of Moving Things," filed Jan. 14, 2016, the complete subject matter of each of which is hereby incorporated herein by reference, in its respective entirety.

A network of moving things in accordance with various aspects of the present disclosure is able to communicate data with both mobile and fixed NUs. For example, the mobile NUs 724, 725 in their respective vehicles 742, 741 of FIG. 7 may not have continuous access to or communication with the data storage of cloud 760. In accordance with various aspects of the present disclosure, such mobile NUs (e.g., OBUs/MAPs) may leverage any existing communication connections that are available such as, for example, cellular, DSRC, Wi-Fi, or other suitable communication technology. In accordance with various aspects of the present disclosure, mobile NUs such as, for example, the NUs 725, 724 of their respective vehicles 741, 742 of FIG. 7 may, for example, communicate with fixed NUs such as, for example, the NUs 753, 737, 738 of FIG. 7, using the EPIDEMIC communication methodology, described above.

In accordance with various aspects of the present disclosure, user devices and various sensors (e.g., sensors connected to NU 730) of a vehicle may not have direct access to or be in communication with the data storage of the cloud 760, and therefore may leverage the connectivity provided by an NU such as, for example, the "relay" NU 724 of vehicle 742, to which they may connect. Such relay NUs (RNUs) may communicate with any such user devices and sensors, in order to enable any such user devices and sensors to communicate data with, for example, the Cloud 760.

The ever growing volume of information generated by the huge variety of connected devices raises constant challenges in providing reliable transport for that data. Within a few years, with the continued proliferation of the Internet of Things and further deployment of wireless user device and smart sensors, the transportation of the growing volume of data generated by and destined for such devices will present a tremendous challenge not only in terms of the amount of bandwidth required, but also with regard to connectivity costs.

A network in accordance with various aspects of the present disclosure, which may be referred to herein as the "Internet of Moving Things" (IoMT), provides a platform that is highly optimized for the transport of data generated by and destined for, for example, user devices and various sensors in the area served by such a network, in a very scalable way. Additional details regarding interfacing among sensors and a network in accordance with various aspects of the present disclosure may be found, for example, in U.S. Provisional Patent Application No. 62/222,135, entitled "Systems and Methods for Collecting Sensor Data in a Network of Moving Things," filed Sep. 22, 2015. Additional details regarding adapting the granularity, bandwidth, and priority of sensing and disseminating data may be found, for example, in U.S. Provisional Patent Application No. 62/253,249, entitled "Systems and Methods for Optimizing Data Gathering in a Network of Moving Things," filed Nov. 10, 2015. The complete subject matter of each of the above-identified provisional patent applications is hereby incorporated herein by reference, in its respective entirety.

All of the data collected by elements in a network of moving things is potentially valuable for a wide variety of applications and insights, most of which are yet to be discovered. End-to-end data integrity is important in any network, and is particularly so in a network such as the IoMT of the present disclosure, considering the variety of elements and processes involved in its acquisition. At the present time, just a small fraction of the data collected from connected devices is actually being used. However, network support for the collection of high definition data is of increasing importance. A network in accordance with various aspects of the present disclosure provides the foundations for an analytics system that uses collected sensor and other data to provide, for example, optimizations and predictions in a wide variety of different areas (e.g., transportation, environment, and/or communication).

The mobile and dynamic network infrastructure that provides support for a network of moving things such as that described herein may provide an interface for a number of clients/customers/users such as, for example, third-parties that wish to test their own applications, vehicle fleet operators that desire to deploy their own fully-managed services to control and manage their fleets, and telecommunication network (telco) operators that want to expand their infrastructure (e.g., fiber infrastructure, cellular infrastructure, etc.). Because a network of moving things according to various aspects of the present disclosure may be used by a wide variety of different entities and applied for numerous applications and purposes, the operation of such a network may use policies to, for example, control access to the network by each of the clients, and manage the use of the applications that are employed to monitor, diagnose, and survey the status of the network elements and of the network environment. Such software applications that monitor and survey the network include, by way of example and not limitation, software applications that monitor the status of the critical hardware modules and system software applications to enable corrective action can to be taken when abnormal behavior is detected, software applications that monitor network behavior to understand and evaluate how the network is working and to diagnose possible problems, and software applications that perform surveys/studies in the network to gather information from the network to help in deploying and configuring the network in an optimal way. Such a software application may also monitor and track the characteristics of user wireless communication sessions, to infer passenger loading in a network of moving things.

Execution of such software applications by various network elements may involve access to shared data available in the system (e.g., information about neighboring network elements, information about central processing unit (CPU) load, information characterizing/identifying available sensing, communication, storage, or other technologies of a network element), access to particular sources of information (e.g., Global Navigation Satellite System (GNSS)/Global Positioning System (GPS) receivers, OBD/OBD-II/2 information, etc.). Execution of such software applications by network elements may also involve the use of certain levels of resources (e.g., a minimum/desired amount of bandwidth used/needed to send data to, e.g., the Cloud; the amount of memory needed (e.g., disk space, flash memory, random access read/write memory, etc.), and each software application may be assigned a priority that may be used to determine whether the software application should run, or not run, when other software applications having their own assigned priorities are also present on a network element. Each software application may have a different mode of operation (e.g., may use a particular level of resources (e.g., a certain amount of data storage), or may have a certain length sampling period), and in accordance with aspect of the present disclosure may be dynamically configured and adapted on-demand. In addition, such software applications may receive inputs/data from a client/customer/user system external to the network described herein (e.g., using an API accessible, for example, locally or from the Cloud) that may, for example, affect the modes of monitoring/surveying performed by the software application. A network of moving things in accordance with aspects of the present disclosure may decide whether such received inputs/data will be applied or enforced in the network, because more than one external source or entity may provide such inputs/data.

A network of moving things in accordance with various aspects of the present disclosure enables the smooth and harmonized coexistence of a variety of software applications that perform monitoring in a highly dynamic and moving environment based on, for example, the context information of the system itself and also the context of the vehicle(s) on which network elements are located. A network system in accordance with aspects of the present disclosure automatically adapts, for example, the assigned priority, the levels of assigned physical interfaces (PHY)/communication resources, the periods of time that the software application is active and inactive (e.g., turn-on/turn-off), the modes of operation of the software application, and the status of each monitoring application. Such a system may, by way of example and not limitation, adapt the granularity, sampling period, type of data, and the resources used by different monitoring applications, and may prioritize software applications that perform monitoring and surveying, one over another, as well as with respect to the client's services and software applications running on a network element (e.g., Internet access, data acquisition, etc.) such as, for example, a mobile AP, fixed AP, or MC/NC. In this manner, a network of moving things in accordance with various aspects of the present disclosure may provide improved handling of the volatility of the resources and high mobility of nodes of the network.

In a network of moving things in accordance with various aspects of the present disclosure, different elements of the network (e.g., network nodes such as the OBU/MAP, FAP, NC, MC, etc. described above) may be in different operational states, and each network element may have a specific combination of information (e.g., a context, actions, and events) that enable the network element to transition from one operational state to another. In a network as described herein, there may be specific situations in which a network element in a specific operational state is unable to communicate with other elements of the network. Such situations may involve decision(s) about maintaining the network element in its present operational state, or changing the operational state of the network element. In accordance with various aspects of the present disclosure, some network elements during operation may transition to operational states in which the network element is unable to be accessed from outside (i.e., from neighboring elements or other network elements that are not near the affected network element). In such a situation, there may be some transitions between operational states that are triggered automatically or autonomously and without significant delay, to avoid abnormal operation of the network.

Therefore, network elements (e.g., network nodes such as an OBU/MAP, FAP, NC, MC, and/or Cloud-based network elements/systems) in a network of moving things in accordance with various aspects of the present disclosure know their own operational state, and may know the operational state of some (e.g., "neighbor" network elements (nodes) with which the network element is in wireless communication) or every other element of the network, in real-time. In such a network, one or more network elements may be aware of all processes of operating and maintaining the network, and may maintain information (e.g., parameters, rules, guidelines) that are used to determine what specific situations cause a transition in the operational state of those network elements, or other network elements. Such network elements may be programmed with information representative of the flow of each process, and the requirements/conditions/events that define when a network element transitions from one operational state to another operational state, including what permissions for changing from one operational state to another operation state may be required/enforced.

A network of moving things in accordance with aspects of the present disclosure enables improved inventory/warehouse organization in terms of, for example, operational state classification of each network element. This enables the creation of standard processes that allow all members of the teams working on network element assembly/manufacture, configuration, provisioning, deployment, repair, and network operation and maintenance to perform their duties based on the same information and common rules/procedures. Standard processes may be used to help avoid shortcuts by clients/subcontractors/integrators/operational personnel, because all network element and team member actions may be monitored and logged, and may follow a known set of rules/procedures, and because events and actions are therefore clear and simple. In a system according to the present disclosure, such rules/procedures may be automatically enforced, and network elements may maintain "internal states" that are separate from "external states" of the network element. Because the functional components of a network element may have numerous internal decisions and states as part of their operation, there may be information about some operational states of a network element that is kept internal to the network element, as such information may not be of use, or should not be known, to network elements outside of the network element during normal operation of the network. It should be noted, however, that in certain situations, detailed information about internal operational states of a network element/node may be communicated to other network elements/nodes, to aid in assessing the causes and solutions to correct improper operation of the network element/node, and proper management of the network element.

A network of moving things in accordance with various aspects of the present disclosure provides the functionality to control and manage, and to quickly adapt the operational states in which different network elements (e.g., nodes such as OBU/MAPs, FAPs NCs, MCs, etc.) are working, based on different internal/external needs, events, and/or contexts, in order to improve and/or optimize the operation of a network of moving things. The following discussion provides details concerning an example state machine for managing a network of moving things, and the nature of the transitions between operational states of that state machine. The following discussion discloses the meaning of each of an example set of operational states of network elements, and information that characterizes each operational state. In accordance with aspects of the present disclosure, variables such as, by way of example and not limitation, geographic or physical location (e.g., geographic coordinates, service areas, map locations), and vehicular contexts such as, for example, the services being accessed by users, vehicle mobility, vehicle speed, and/or vehicle and user density may affect the operational state of a network element/node. Network elements may, for example, take into account the conditions and/or context that are involved in a transition from one operational state to another, including the events that may trigger the transition from a specific operational state to another. In accordance with various aspects of the present disclosure, different entities/individuals/personnel such as, for example, the clients/subcontractors/integrators/operators of the network may "own" different operational states, and some operational states may be internal to a network element, and/or may be known externally. In accordance with some aspects of the present disclosure, clients/subcontractors/integrators involved in network deployment and control may have access and/or control over particular operational states and/or state transitions, including to and between sub-states that are specific to their function in the network. A network of moving things in accordance with the present disclosure may track and log each modification to a network element (e.g., change in operational state, change of configuration, change of electrical/mechanical hardware, change of operating parameters), including what entity/individual initiated the modification, and the reasons for the modification. The systems of a network in accordance with the present disclosure may maintain, over time, the procedures, process flows, and logs of actions with respect to network elements, which may be accessible via, for example, the Cloud (e.g., the Cloud of FIG. 1 or Cloud 760 of FIG. 7), and may, for example, collect and maintain maintenance reports and return material authorizations (RMAs) for network elements, may track where each network element is and/or has been installed, what components/parts of network elements have been replaced, and track the installed software images in each network element.

Figure 8:
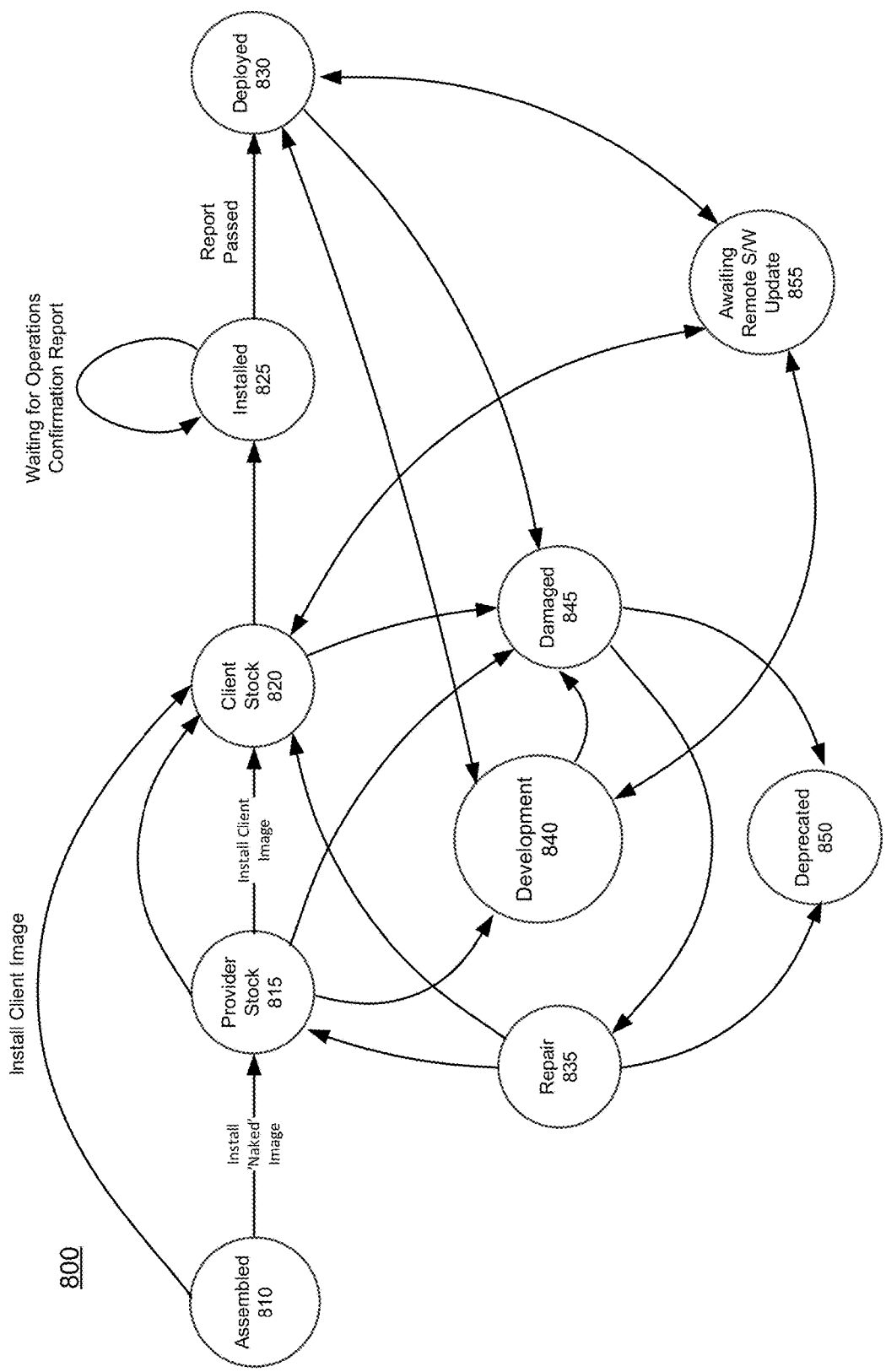
FIG. 8 shows a diagram of the operational states of an example state machine, in accordance with various aspects of the present disclosure.

FIG. 8 shows a diagram of the operational states of an example state machine, in accordance with various aspects of the present disclosure. Use of a state machine such as that of FIG. 8 may be used to improve and smooth transitions during the process of deploying and establishing control of network nodes, and helps to avoid the use, by those involved with the network, of shortcuts that may compromise the correct flow of operations of nodes in the context of a network of moving things. The example state machine of FIG. 8 includes an "Assembled" state 810, a "Provider Stock" state 815, a "Client Stock" state 820, an "Installed" state 825, and a "Deployed" state 830. FIG. 8 also includes a "Repair" state 835, a "Development" state 840, a "Damaged" state 845, a "Deprecated" state 850, and an "Awaiting Remote S/W Update" state 855. The example states of FIG. 8 will be described in detail below. In the context of the following discussion, the term "client" may be used herein to refer to a company that buys equipment and solutions directly from an equipment provider. The purchased equipment may be installed by the client company, or may be resold to another company. In the latter case, the selling company may be referred to as a 'partner'. The term "subcontractor" may be used herein to refer to a company that helps an equipment provider with field operations, such as physically installing the equipment purchased by the client. A subcontractor may also aid the client in performing maintenance work such as, for example, in the case of equipment failure, repair, software installation, or as a first line of support for the client or users of the service supported by the equipment. The term "integrator" may be used herein to refer to a company that assists an equipment provider with the integration of equipment of a provider's network with existing infrastructure. An integrator may, for example, be an entity within the client. For example, many times clients of equipment providers have a team that is able to handle the tasks involved in integration of new equipment/software with existing equipment/software of the client. A network of moving things in accordance with various aspects of the present disclosure is arranged to handle interconnections with different types of wireless and wired networks, handle a variety of different types of routings, employ different methods of access, even when multiples of various network elements (e.g., RSUs/FAPs, NCs, etc.) are present in the same network, for example. A system such as that described herein is designed to guarantee that every step necessary to build out and configure a network of moving things according to aspects of the present disclosure is followed, to avoid poor or incorrect installations/configurations or the omission of steps of procedures. Unlike cellular network operators that typically own their own network, RSUs/FAPs and OBUs/MAPs of a network in accordance with various aspects of the present disclosure may be required to handle different types of wireless interfaces (e.g., Bluetooth®, Wi-Fi, DSRC, cellular, etc), while the same time supporting different VLANs and different types of access in each interface, making it difficult to configure the myriad of combinations and yet ensure that there are no gaps in the build out and configuration processes. In addition, a system and network as described herein may include the complexity of addressing the presence and configuration of network elements such as, for example, RADIUS servers, and different forms of authentication, per interface, per device and/or per user. Networks and systems in accordance with aspects of the present disclosure provides for a personalized approach for each client, due to the differing needs of each client.

In accordance with aspects of the present disclosure, a particular network element may be assigned the "Assembled" state 810, or a similar or equivalent state, when the particular network element includes all of the component parts (e.g., mechanical/electrical hardware, enclosure, and firmware/software/configuration data) that are defined as being present in a finished or completed copy of the particular network element. A network element in the "Assembled" state 810 may be assigned a unique identifier (e.g., one or more of a model, part, and/or serial number/identifier) to enable a system in accordance with the present disclosure to track, for example, the existence, state, physical location, vehicle in which installed, etc., of every network element produced, throughout the "lifetime" of the network element. In the case of failure of a certain network element, the operator of a network of moving things as described herein may then know, for example, from the unique identifier, for what vehicle(s) (e.g., for mobile network elements), at what physical location(s) (e.g., for both mobile and fixed network elements), service personnel may needed to be dispatched to correct the problem(s), based on the unique identifiers of the specific network nodes that have problems.

In accordance with aspects of the present disclosure, a particular network element may be assigned to the "Provider Stock" state 815, or a similar or equivalent state, when the particular network element (e.g., mobile/fixed AP and/or other network element/component) is physically present/stored in stock in a facility (e.g. a warehouse) owned/operated by an entity that provides the network elements/components to an operator of a network as described herein. Such facilities may, for example, be in different geographical areas, and information/characteristics for a particular network element in the "Provider Stock" state 815 may, for example, include information that identifies the name, street address/city/state/country, and/or latitude/longitude position of the facility at which the network element in the "Provider Stock" state 815 is stored.

In accordance with aspects of the present disclosure, a particular network element may be assigned to the "Client Stock" state 820, or a similar or equivalent state, when the particular network element (e.g., mobile/Fixed AP and/or other network element/component) is physically present/ stored in stock in a facility (e.g., a warehouse) owned/ operated by a client/integrator/manufacturer (i.e., a space that isn't owned/operated by a provider of the network elements/components), so the product is not in control of the provider of the network element/component (e.g., node).

In accordance with aspects of the present disclosure, a particular network element may be assigned to the "Installed" state 825, or a similar or equivalent state, when the particular network element (e.g., mobile/Fixed AP and/or other network element/component) is physically installed (e.g., in a vehicle or at a fixed physical location) to provide service. It should be noted that, in accordance with some aspects of the present disclosure, although a network element/component (e.g., an OBU/MAP, FAP, etc.) may be assigned to the "Installed" state 825, the network element may still not be "approved" for use/service, in terms of either the installation of the network element and/or the status of the software/firmware present on the network element.

In accordance with aspects of the present disclosure, a particular network element may be assigned to the "Deployed" state 830, or a similar or equivalent state, when the particular network element (e.g., mobile/Fixed AP and/or other network element/component) has passed defined validation procedures or testing (e.g., report tests) and is ready to provide service as intended by the service provider/ network operator/client.

In accordance with aspects of the present disclosure, a particular network element may be assigned to the "Repair" state 835, or a similar or equivalent state, when the particular network element (e.g., mobile/Fixed AP and/or other network element/component) has failed or was damaged, and is in the process of being undergoing mechanical and/or electrical repair.

In accordance with aspects of the present disclosure, a particular network element may be assigned to the "Development" state 840, or a similar equivalent state, when the particular network element (e.g., mobile/Fixed AP and/or other network element/component) is being/has been used for things such as, for example, software, electrical (e.g., electromagnetic interference (EMI), electromagnetic compatibility (EMC), electromagnetic pulse (EMP), static discharge), physical (e.g., physical shock, and/or environmental conditions such as temperature and humidity), and/or system testing, and insurance, standards, and/or regulatory compliance testing. It is desirable that network elements involved in such development activities be tracked by assigning the network element/component to the "Development" state 840, because some types of testing/usage may compromise further proper and reliable operation of tested network element/component. Therefore, it is prudent to know the history of each network element/component that has undergone such testing activities.

In accordance with aspects of the present disclosure, a particular network element may be assigned to the "Damaged" state 845, or a similar or equivalent state, when the particular network element (e.g., mobile/Fixed AP and/or other network element/component) must be uninstalled to undergo mechanical and/or electrical repairs. This may occur, for example, when it is not possible to return a unit to operation remotely, such as, for example, when a network element/component (e.g., mobile/Fixed AP and/or other network element/component) previously installed in a vehicle or at a particular physical/geographic location, is physically damaged during an accident, or when the network element/component experiences a failure of parts of the electrical circuitry of the network element/component.

In accordance with aspects of the present disclosure, a particular network element may be assigned to the "Deprecated" state 850, or a similar or equivalent state, when the particular network element (e.g., mobile/Fixed AP and/or other network element/component), for some reason, is in a condition that is not repairable. For example, a network element/component may be assigned to the "Deprecated" state 850, or a similar or equivalent state, when a part of the network element/component has failed or been damaged in a way that makes the unit unusable, and the parts needed to repair the network element/component are no longer available, or the cost of repair exceeds a certain cost, such as may occur when a vehicle containing an older network element/ component (e.g., an OBU/MAP) is involved in a crash, or a network element/component is rendered unrepairable/unserviceable by a fire.

In accordance with aspects of the present disclosure, a particular network element may be assigned to the "Awaiting Remote Software Update" state 855, or a similar or equivalent state, when the particular network element (e.g., mobile/Fixed AP and/or other network element/component) is working in an unexpected or undesirable way, but the problem is software/firmware related, and the repair (e.g., software update) can be done remotely.

The following discussion describes the conditions and events that may be used to determine in which of the states of a network of moving things in accordance with the present disclosure, discussed above, a network element would be at any point in time, and how deployment and control of a network of moving things may be done.

In terms of flow, each network element (e.g., fixed or mobile AP) is first assembled, and therefore starts in the "Assembled" state 810. The initial state assigned to each successfully assembled network element is, therefore, the "Assembled" state 810. In accordance with various aspects of the present disclosure, there may be an additional state (not shown in FIG. 8) between the "Assembled" state 810 and the "Provider Stock" state 815, which may occur after the installation on the assembled network element of what may be referred to herein as a "naked" software image. A "naked" software image may, for example, be a digital copy of a collection or package of instructions and data for one or more processors of an assembled network element. The software image may impart sufficient functionality to the assembled network element to permit the assembled network element to use the various circuit elements of the assembled network element to communicate (e.g., via one or more wireless or wired link(s)) with other network element (s) and/or a cloud-based system (e.g., the Cloud of FIG. 1 or Cloud 760 of FIG. 7), and to receive and install a software image (e.g., a "client" image) having more complete, comprehensive, and/or different functionality than that of the "naked" software image, for operation in a particular network. Such an additional state may be referred to herein as an "Operational Test" state, in which various electrical hardware testing may be performed (e.g., circuit boards/ printed wiring boards (PWBs) are tested using a "bed of nails" tester, in-circuit/JTAG tester, etc.). When the testing conditions of such an "Operational Test" state are passed, the state of the equipment may then be allowed to transition to the "Provider Stock" state 815.

In accordance with various aspects of the present disclosure, a network element may transition from the "Assembled" state 810 to the "Provider Stock" state 815.

The state machine may transition to the "Provider Stock" state 815 after the initial installation of the first base software that, as described above, may be referred to herein as the "base" or "naked" software image. As also describe above, the "base" or "naked" software image may be used to allow the later installation of a software image that provides the specific network element functionality requested/required by the client or customer of the operator of the network of moving things into which the network element will be deployed. In accordance with various aspects of the present disclosure, only equipment that is working properly may be assigned to the 'Provider Stock' stage 815. Some equipment that has been repaired and is working properly may be used as replacements for equipment returned to the provider (e.g., via Return Material Authorizations (RMAs)) and for temporarily replacement, but such equipment may be tagged or otherwise designated so that it will not be shipped for sale by the provider. Such equipment may, however, be used by clients that are renting such equipment. Such equipment may, therefore, still belong to the provider that may manage and install such equipment. Additional states may be added to the example of FIG. 8 to support, for example, equipment stocking, repair, and re-deployment as described above, and states shown in FIG. 8 may be combined and/or eliminated, without departing from the spirit and scope of the present disclosure.

In accordance with various aspects of the present disclosure, a functional network element (e.g., an OBU/MAP, FAP, etc.) in the "Provider Stock" state 815 may be assigned to the "Client Stock" state 820 when, for example, installation of a client software image on the network element has been completed. A network element may also be assigned to the "Client Stock" state 820, for example, following a repair of the network element by the client/subcontractor/integrator. Such state assignment may depend upon the terms of a "service level agreement (SLA)" in place with the client/subcontractor/integrator for the network of moving things in which the network element is to be used. For example, if the repair of a particular network element is able to be performed by the client/subcontractor/integrator, the state of the particular network element following such repair may then (e.g., by the client/subcontractor/integrator) be set to or left at the "Client Stock" state 820. In accordance with some aspects of the present disclosure, in a case in which a specific client software image to be used in a network element for a specific client/subcontractor/integrator is known at the time the network element is in the "Assembled" state 810, the state of the network element may transition from the "Assembled" state 810 to the "Client Stock" state 820 upon installation of the specific client software image upon the assembled network element (e.g., by the provider/manufacturer of the network element). If the network element has been assembled without knowledge of which client/subcontractor/integrator is to receive the assembled network element, the assembled network element may, for example, be loaded with a "base"/"naked"/"clean" software image, which may be updated to a specific software image suitable for a specific client/subcontractor/integrator, at a later point in time.

In accordance with various aspects of the present disclosure, a network element may be assigned to the "Installed" state 825 following physical deployment/installation (e.g., in a vehicle, on a lamppost, at a traffic light, etc., in the case of network elements such as mobile and fixed APs) of the network element, even though it may not contain a final or operational client software image. Such a network element may be loaded with a "base"/"naked"/"clean" software image during/after assembly, which has the functionality to be upgraded after the network element with the "base"/"naked"/"clean" software image has been physically deployed or installed.

In accordance with various aspects of the present disclosure, the state of a network element that has been physical installed (i.e., that is currently in the "Installed" state 825) may be transitioned to the "Deployed" state 830, once all of the software running on the network element has been validated, and the client/subcontractor/integrator has verified that the network element is operating as expected (e.g., by the client/subcontractor/integrator). In accordance with various aspects of the present disclosure, a particular network element already in, or capable of being assigned to the "Deployed" state 830 may be assigned to the "Development" state 840 when, for example, the particular network element is selected for use as a "development" node to be used to implement, test, and/or validate new network functionalities.

The above discussion has described the main state transition flow of a state machine in accordance with aspects of the present disclosure, from network element assembly to deployment of the network element for in-service use by end-users (e.g., physically installed and validated in the network as fixed or mobile APs, etc.). The following describes a number of states that may be referred to herein as "appendix" states, which may also be a part of the workflow.

In accordance with various aspects of the present disclosure, a network element may, for example, be assigned to the "Awaiting Remote S/W Update" state 855 when the network element (e.g., an OBU/MAP, FAP, NC, MC, etc.) is already installed and is, for example, being used to provide client/user service(s) or for development purposes, and the network element is having operational problems that appear to be software-related and can be solved using a remote update, or the network operator desires to activate a new or updated communication protocol, and/or install a new or updated software application.

In accordance with various aspects of the present disclosure, a network element may be assigned to the "Damaged" state 825 when it is determined that the network element is no longer functioning as intended, due to, by way of example and not limitation, any failure of the electrical or mechanical hardware, the software, an error in assembly of the network element, and/or if a mechanical component has failed or been damaged. Such a state assignment may be done by, for example, the client/subcontractor/integrator or the operator of the network of moving things. In accordance with aspects of the present disclosure, a particular network element may be assigned to the "Damaged" state 825 when the particular network element has a problem that cannot be fixed remotely. In such a situation, it may be necessary for the client/subcontractor/integrator or field engineers from the provider of the network element to go to the physical location of the network element and determine the nature of the problem. In accordance with various aspects of the present disclosure, operations/field teams/system integrators/etc. may be provided with specific devices and/or software applications (e.g., mobile "apps") to help them to track problems and do more debugging in the field than has been feasible to perform remotely when using prior art systems/networks. In addition, network elements according to aspects of the present disclosure (e.g., MAPs/OBUs, FAPs/RSUs) may run specific debug application that provide local access via Wi-Fi, serial cable (e.g., RS-232, Universal Serial Bus (USB)), Ethernet, Bluetooth®, DSRC, or other suitable communications interface, which enables easier access to logs or reports. In accordance with various aspects of the present disclosure, an assessment by a client/integrator/contractor that a particular problem with a network element can or cannot be fixed on-site may be propagated into the system that manages/tracks the operational status of each network element of the network. As soon as the client/integrator/contractor provides an indication that the problem can/cannot be fixed, a flag may be raised (e.g., set) in a database of the system/network, to indicate whether the particular network element needs to be monitored and/or the nature of the problem that has been observed/detected. A goal of this approach is to decrease the number of false alarms that may occur, since it become evident that something in the system/network is not working as intended. In that case, the system/network according to aspects of the present disclosure may begin to ignore the network elements (e.g., OBUs/MAPs, /RSUs/FAPs, NCs, etc.) with problems (e.g., fail to take certain actions taken when problems are first detected), and may send alerts when, for example, delays in resolution of the problem occur. In accordance with various aspects of the present disclosure, each person involved in system/network build out and configuration (e.g., operators, contractors, equipment vendors, integrators, installers, etc.) may be assigned a personal ID and personal authentication, which may be used to identify who sent the report of a problem that was found. A network/system in accordance with aspects of the present disclosure may, for example, employ different access controls/permissions for each particular system integrator, and may also provide for different levels of individual access controls/permissions for each employee/worker of the particular system integrator. For instance, employees of a particular company that have expertise in networking and programming may be assigned "read/write access" to various network elements (e.g., FAPs/RSUs/OBUs/MAPs, NCs), to allow those individuals to attempt to solve the problem in the field or at their premises. However, the same company may also have field technicians that have only been assigned "read access," or in some cases, the access permissions may be completely denied, and those individuals may only be given instructions to replace the ailing network element (e.g., FAPs/RSUs/OBUs/MAPs, NCs, etc.) and to then return the network element for analysis later, in a lab.

In accordance with various aspects of the present disclosure, a network element assigned to the "Damaged" state 845 may be assigned to the "Deprecated" state 850 or to the "Repair" state 835, depending upon the condition of a network element. The state of a network element assigned to the "Damaged" state 845 may be transitioned to the "Deprecated" state 850, if it is determined that there is no way to satisfactorily repair the network element. However, if the network element is determined to be able to be satisfactorily repaired, the network element may be assigned to the "Repair" state 835. When the repairs to the network element have been completed, the network element may then be assigned to the "Provider Stock" state 815 or to the "Client Stock" state 820, depending upon the SLAs and repair capabilities of the operator of the network or the client/subcontractor/integrator.

In accordance with various aspects of the present disclosure, various states of the state diagram of FIG. 8 may be configured to be manageable by the provider of the elements of the network, by the client/subcontractor/integrator responsible for network deployment, and/or by the operator of the network. For example, some states shown in FIG. 8 may not be accessed or changed by the client or integrator such as, by way of example and not limitation, the "Assembled" state 810, the "Vendor Stock" state 815, the "Client Stock" state 820, the "Repair" state 835, the "Development" state 840, and the "Deprecated" state 850. However, the client/integrator/contractor may, for example, be permitted to have influence, access, and/or control over whether a given network element is in the "Installed" state 825, the "Deployed" state 830, the "Damaged" state 845, and the "Awaiting Remote S/W Update" state 855 of FIG. 8.

Other states including, by way of example and not limitation, the "Assembled" state 810, the "Provider Stock" state 815, and the "Repair" state 835 may be configured to be manageable by the entity that provides network elements and manages stock of such network elements. As soon as network elements are deployed, there may exist some states that are controlled and/or owned by the operator of the network such as, by way of example and not limitation, the "Deployed" state 830, the "Installed" state 825, the "Awaiting Remote SW Update" state 855, and the "Damaged" state 845. All management of the states of the network elements may be done via a web-based interface; where each user of the system implementing the state diagram of FIG. 8 is provided a specific login that denies or allows access, monitoring, and control of state assignments, changes, and transitions in a customized way. In accordance with various aspects of the present disclosure, a client using the network may have access only to the network elements that are under their supervision or "ownership." In accordance with various aspects of the present disclosure, some members of a designated organization (e.g., the vendor of various network elements) may be allowed unlimited access (e.g., "root access") to all network elements and network clients, while other members may not. In such a situation, all changes made to the network/system by someone from the designated organization may automatically be logged (e.g., in a secure server) in order to ensure tracking and logging of all modifications and changes to the system/network.

The following discussion focuses on aspects of the present disclosure related to management of the entire state machine of FIG. 8, and the transitions between states. In accordance with various aspects of the present disclosure, some state transitions may be initiated manually (e.g., by a field engineer, provider of the network elements, or operations or maintenance staff of the network operator/client/subcontractor/integrator) while others may be autonomous and automatic, initiated by, for example, mobile or fixed APs, or other network elements (e.g., NC, MC, Cloud-based system). Such state transitions may be in real-time, occurring as network events and/or conditions match defined rules, and some may be delayed and/or relayed for further analysis by, for example, a Cloud-based system (e.g., Cloud of FIG. 1 or Cloud 760 of FIG. 7) or network operations personnel. State changes initiated manually or autonomously/automatically may, for example, be reported to a Cloud-based system, to enable records or logs of all network element state changes to be tracked and managed. Access to the Cloud-based system that maintains such records/logs may be provided via, for example, pages of a dedicated website, short message service (SMS), multimedia messaging service (MMS), email, or other communication mechanisms. In accordance with various aspects of the present disclosure, artificial intelligence techniques may be applied at all elements/nodes of a network/system. For example, in a situation in which a particular network element does not currently have a working backhaul communication link, but the particular network element is powered on, the approach of a less advanced network/system may be to simply present the status of the particular network element in a user interface such as, for example, a "dashboard" that indicates that the particular network element is "down." Because the backhaul communication link of the particular network element is not functioning, no additional information can be retrieved, and the operator of the network/system may only know that the particular network element cannot be reached. In a network/system in accordance with aspects of the present disclosure, however, other network elements (e.g., nodes) may be used to collect more information about the particular network element (i.e., the network element without a backhaul communication link), and those other network elements may send more information about the particular network element to, for example, a cloud-based system using, for example, a delay-tolerant or real-time communication mechanism, informing the recipient that the problem with the particular network element is a backhaul failure, but that the particular network element is powered on. With this information in hand, the cloud-based system is then able to contact service/operational personnel (e.g., the service provider) asking if they are experiencing problems (e.g., on a specific network element, or something similar). In addition, network elements in accordance with aspects of the present disclosure such as, for example, MAPs/OBUs, may provide logs from, for example, FAPs/RSUs automatically, and may send such log information to, for example, the cloud-based system. Also, network element such as those described herein (e.g., MAPs/OBUs, FAPs/RSUs, NCs, etc.) may inform an operator interface (e.g., a "dashboard") that a particular route of travel is not providing a particular level of coverage of wireless service, taking into account the last values received. This may indicate to a viewer of the operator interface that a certain network element (e.g., a FAP/RSU) may, for example, need some antenna tuning/ adjustment. The example improvement being described here is that the system/network not only receive information from a network element/node that is having a problem, but also to use the mesh of network element in accordance with aspects of the present disclosure to propagate more information in a smarter way, or even to fix the problem automatically. For example, if the software/firmware of a network element becomes corrupted for some reason, another network element that is able to communicate with the damaged network element may, for example, force a "format" and a clean installation/update of software/firmware of the network element having the problem.

For example, in accordance with aspects of the present disclosure, some state transitions may occur automatically such as, by way of example and not limitation, a transition of the operational state of a network element from the "Damaged" state 845 to the "Repair" state 835, or from the "Installed" state 825 to the "Deployed" state 830. For example, in accordance with various aspects of the present disclosure, to pass from the "Installed" state 825 to the "Deployed" state 830, the verification of a number of conditions may be involved (e.g., check lists of conditions/ items to be checked to approve the transition). The "Installed" state 825 may be used to signify only a physical installation of equipment/software. In accordance with aspects of the present disclosure, it may be possible for a piece of equipment to transition to the next state only after, for example, a "field report" is completed successfully. Conditions for successful completion of such a field report may include, for example, successful completion of a Wi-Fi service test, the ability to "surf" (i.e., browse) the Internet, successful completion of a check that the GNSS/GPS receiver and related application software is working properly, successful completion of a check that a "captive portal" is being displayed in accordance with certain conditions/ parameters, successful completion of a test that the inbound/ outbound captive portal functionality is working properly, a verification that response times are within certain bounds, etc. With regard to a transition from the "Damaged" state 845 to the "Repair" state 835, such a transition may depend upon an evaluation of the severity of the damage to the equipment. For example, if the damage to the equipment is a component that is impossible or impractical to replace (e.g., an integrated circuit (IC) chip, for instance), the equipment in question may be tagged for transition to the "Deprecated" state 850. However, many problems that may be encountered can be repaired (e.g., replacement of failed/ damaged capacitors, resistors, mini-PCI devices, LEDs, etc.) and in such cases, the network element/equipment may be tagged for transition to the "Repair" state 835, to be repaired by a specialist. However, other state transitions may not be permitted to happen automatically or autonomously, as approval by client/subcontractor/integrator/operations personnel may be required such as, for example, from the "Provider Stock" state 815 or "Client Stock" state 820 to the "Installed" state 825. In such example operational states, manual input may be required because, for example, field work of personnel may be involved.

In accordance with various aspects of the present disclosure, network elements such as, for example, network nodes (e.g., mobile or fixed APs, NCs, MCs, etc.) may automatically, or upon operator intervention or initiation, run predefined tests of software and electrical hardware. If the results of such testing at a particular network element indicates problems in the network element, the network element may autonomously and internally change its operational state from the "Installed" state 825 to the "Damaged" state 845 (e.g., for failures that the network element may determine cannot be fixed remotely) or to the "Awaiting Remote SW Update" state 855 (e.g., for problems that the network element determines may be correctable by a software update), and may notify a neighbor node (e.g., a network element within wireless communication range) and/or a Cloud-based system (e.g., the Cloud of FIG. 1 or Cloud 760 of FIG. 7) about this change to the state of the particular network element. Such information may be logged or recorded and, if correction of the problem involves a visit by a member of the field service staff, the appropriate field engineer may be manually or automatically dispatched.

In accordance with some aspects of the present disclosure, each network element (e.g., network node) may share its own operational state with all other elements of the network. However, in accordance with other aspects of the present disclosure, a network element may share its own operational state just with those (e.g., neighboring) network elements that may be affected by problems that the network element is experiencing. In some instances, when a network node is in a specific operational state or experiencing a problem (such a network node may be referred to herein as an "impaired" network node), other network nodes (e.g., neighboring network nodes—those nodes within wireless communication range of the impaired node; network nodes through which communications of the impaired node may pass; and/or network nodes that support a service that may be requested by the impaired node) may be made aware of the operational state/problem of the impaired network node. Nodes of the network that are made aware of the operational states/problems of other nodes of the network may maintain a separate or shared collection of information that includes such operational state/problem information linked to the identity of the respective node that reported the operational state/problem information. In accordance with various aspects of the present disclosure, a first network node having access to such information may then analyze the collection, before attempting to communicate with a second network node (e.g., to request information, to request a service, to communicate with other node(s) and/or the Cloud of FIG. 1 or FIG. 7), to determine whether an operational state/problem of the second network node is likely to adversely affect the ability of the second network node to respond/handle the communication of the first network node properly. This allows the first network node to avoid forming a dysfunctional connection with a second network node that is impaired and cannot properly handle the communication of the first network node. It should be clear that such operational state/problem information may be quite dynamic, particularly in a network of moving things as described herein. For example, operational state/problem information acquired from a second node by a first node because the second network node was previously a neighbor node (i.e., was within wireless communication range of the first node at some time) may quickly become meaningless when the first and second nodes are no longer neighbor nodes. In some cases, the second node may not share such operational state/problem information for some reason. This may cause such information to become inaccurate and unreliable, and may be considered to have expired after a certain threshold amount of time has passed since receipt. Such expired operational state/problem information may be deleted upon expiration, or may be indicated by a marker or an expiration date/time/period, and may be updated when the second node again receives first node operational state/problem information.

In accordance with aspects of the present disclosure, every network element (e.g., network node such as a mobile or fixed AP), may share their own operation state with other network elements, and may receive and cache the operational state of other elements of the network, in particular, the neighboring network elements with which they may interact. This may be implemented through the use of API calls by the operational software and software applications of each network element. In this manner, each network element has operational state information in its own cache for neighboring network elements and possibly additional network elements, so that each network element has the capacity to ignore or bypass interaction with some network elements that may have problems. In addition, each network element may periodically share knowledge of its own operational state and that of its neighboring network elements with other network elements (e.g., network element A telling network element B about the operational state/problems of network element C that is not a neighbor of network element A).

For example, if a first network element (e.g., an OBU/MAP, FAP, NC, MC) knows, for instance, that a second network element nearby, to which it is able to connect, has a problem with the operation of the GNSS/GPS receiver of the second network element, the first network element may choose to connect to the second network element anyway, because the first network element may be aware that such a problem does not impair the ability of the second network element to respond to any messages/requests/information sent to the second network element by the first network element. However, if the second network element has a problem with internal message routing (e.g., routing of received messages) that makes the Internet unreachable, the second network element may be placed on a "blacklist" of network elements that are unusable for certain purposes (e.g., accessing the Internet) by the first network element, and may be avoided when the first network element is looking to identify network elements to use to establish such Internet connections.

In accordance with certain aspects of the present disclosure, if a Cloud-based system (e.g., Cloud of FIG. 1 or Cloud 760 of FIG. 7) does not know the operational state of a particular neighboring or other network element, a network element seeking such information may locally access that information in its own cache of information about operation status/problems of elements of the network. In some instances in accordance with the present disclosure, the network nodes may maintain, in a local cache, the operation states/problems of those network elements having problems based on the severity of the problems/dysfunction of each of the other network elements. For example, in accordance with aspects of the present disclosure, a particular network element may be using a cellular data service for communication, and may (e.g., based on operational rules/configuration information for the particular network element) desire to use a DSRC link for communication (e.g., with a neighboring mobile/fixed AP), to decrease the costs of the communication. Without knowledge of the operational state of neighboring network elements, the particular network element might connect directly to the neighboring network element (e.g., the neighboring mobile/fixed AP). However, if something then goes wrong with that DSRC link to the neighboring network element (e.g., the mobile AP moves out of wireless range of the particular network element), the particular network element might then return to the cellular data service, resulting in a loss of 2 or 3 seconds of data and possibly cause the dropping of any active user sessions. In accordance with aspects of the present disclosure, the knowledge of the operational state of nearby network elements helps to avoid such a scenario.

In accordance with aspects of the present disclosure, the failure of an API or the absence of cached operational state/problem information regarding a neighboring network element may be overcome by the ability of the network element to test the neighboring network element to determine the connectivity through the neighboring network element, before the network element attempts to connect through its neighboring network element. In such a situation, a particular network element may provide backhaul of data using cellular data service and may, in parallel, test a DSRC link before attempting to switch user data traffic from the cellular data service to the DSRC link, to ensure that the particular network element can use the DSRC link as a different backhaul data communication path. In accordance with aspects of the present disclosure, the particular network element may, for example perform a simple "ping" test, or request from the neighboring network element, the amount of bandwidth that is available. It should be noted that network elements of a network of moving things in accordance with various aspects of the present disclosure may perform a variety of checks before permitting a network element to change from one operational state to another operational, depending on the nature of the change in operation states and the possible detrimental or beneficial effects on the network.

In accordance with various aspects of the present disclosure, each network element (e.g., a node such as a mobile or fixed AP, NC, MC, etc.) has the capability of changing its own operational state, taking into account some premises. In addition, each network element has the capability of triggering a change in the operational state of other network elements. For example, all network elements in a network according to the present disclosure are permitted to change their own operational state when, for example, a need for repair of a particular network element is detected by the particular network element, and/or for the particular network element to alert other network elements (e.g., neighboring network elements or the Cloud) that a repair of the particular network element is needed, and/or that a repair to a neighboring network element is needed. In a situation in which a particular network element is unable to change its operational state, or to communicate the change of operational state to, for example, neighboring network elements or the Cloud, the neighboring network elements may report (e.g., to the Cloud or a neighboring network element, based on a failure of the particular network element to communicate a change expected/requested by the neighboring network element) that the particular network element is not working properly. A network of moving things in accordance with aspects of the present disclosure may, in such a situation, open what is referred to as a "ticket." a recorded instance of a network problem, and may notify support personnel (e.g., field engineers/repair personnel, maintenance staff) so that the needed corrections/repairs may be made as soon as possible. In some cases, where attempts are made to open multiple "tickets" for a single network element (e.g., when a single network element is experience problems with both communication using DSRC and operation of a GNSS receiver), the system may avoid opening two or more "tickets" and may merge the two issues into one "ticket."

In accordance with various aspects of the present disclosure, elements of one or more systems of the network of moving things as described herein (e.g., network element such mobile and/or fixed APs, NCs, MCs, the Cloud) may monitor the amount of time that passes from when an operational state change is requested and/or initiated, until the requested and/or initiated operational state change actually occurs. For example, for maintenance purposes, to enable the generation of reports to clients/subcontractors/integrators/operators, and to derive performance information about the behavior of the network, the systems of the network may monitor the amount of time that passes from when a problem in a network element is detected (e.g., a failure or problem that leads to a change in operational state of a network element to the "Awaiting Remote SW Update" state 855, or the "Damaged" state 845) until the failure or problem is resolved (e.g., the network element is returned to the "Installed" state 825, or is assigned to the "Client Stock" state 820 or "Provider Stock" state 815).

In accordance with various aspects of the present disclosure, a network element that is, for example, installed in the network (e.g., that has been assigned to the "Installed" state 825), or a network element that underwent a software update (e.g., assigned to the "Awaiting Remote S/W Update" state 855) may perform a set of tests to, by way of example and not limitation, evaluate the connectivity, the ability to access the Internet, the number of users connected to the network element (e.g., via Wi-Fi, the network element acting as an access point (i.e., FAP, MAP)), etc., before the network element is permitted to transition back to the "Installed" state 825. In some instances, a system according to the present disclosure may consider an operational state transition of a particular network element successful only after receiving feedback of a certain number of users that are, for example, accessing the Internet through that particular network element, or after receiving information from a certain number of neighboring network elements that have connected to/communicated with that particular network element. In this way, a network in accordance with aspects of the present disclosure may include additional checks before permitting or accepting a state transition. In addition, a transition of a network element to the "Damaged" state 845 or "Awaiting Remote S/W Update" state 855 may involve more than one confirmation of the events/conditions that prompted the change in operational state. In accordance with various aspects of the present disclosure, one or more thresholds or conditions may be required to be met before a change from one operational state to another operation state is made, due to the cost(s) of transitioning a network element into and/or out of particular network element operation states. A network of moving things that employs the system approaches described herein may track every action/step and every operational state of every network element, including the cause(s) of any transition(s), any personnel that initiated the transition(s), and the reason(s) why the transition(s) was/were initiated. Such a system may ensure that all conditions/procedures/authorizations that have been defined for transitions between operational states of network elements are followed, so that a network element is not permitted to transition from, for example, the "Damaged" state 845, directly to the "Installed" state 825.

FIGS. 9A-9D show a flowchart 900 that illustrates the actions of an example method of operating a network element (e.g., a network node), in accordance with various aspects of the present disclosure. The method of FIGS. 9A-9D may be performed by, for example, a mobile AP or a fixed AP of a network of moving things, such as the network described herein, elements of which are shown in and described above with respect to FIGS. 1-8. The steps of the method illustrated in FIGS. 9A-8D may be represented by instructions stored in a storage device (e.g., a non-transitory computer-readable medium) of a system comprising one or more processors and one or more wireless radio frequency (RF) interfaces configured to communicate with other elements of the network. The one or more processors may execute the stored instructions to perform the steps of the method described below with respect to FIGS. 9A-9D. It should be noted that although the method of FIGS. 9A-9D is illustrated as having a particular sequence of actions, other sequences of actions having a different order may be used, as well as one or more processor performing the illustrated actions sequentially or in parallel on separate processors or as separate processes, without departing from the spirit and scope of the present disclosure. The method of FIGS. 9A-9D begins at block 902.

At block 902 of FIGS. 9A-9D, the network element performing the method may determine whether one or more conditions have been met to enable sharing of current operational state and/or problem information by the network element with other elements of the network described herein. In accordance with various aspects of the present disclosure, the one or more conditions may comprise rules, parameter values, and actions to be taken, which may be received by elements of the network from, for example, a cloud-based system such as the Cloud of FIG. 1 or Cloud 760 of FIG. 7. Operational states may comprise operational states such as, for example, the operational states described above and illustrated in FIG. 8, although a different group of operational states may be employed. Problem information may comprise information representing various anomalies, errors, malfunctions, and/or certain internal operating conditions not uniquely represented by the operational state information of the network element, which may occur during operation of a network element and may be shared with other network elements, illustrative but not limiting examples of which are provided above. If it is determined, at block 902, that one or more conditions have been met to enable sharing of current operational state and/or problem information by the network element with other elements of the network, the method then, at block 904, may share current operational state and/or problem information for the network element with one or more other elements of the network. For example, the network element performing the method may share operating conditions of the network element by wirelessly transmitting information representative of the current operational state and/or problems experienced by the network element to neighboring network elements (one or more network elements within wireless communication range) and/or a cloud-based system such as those of FIGS. 1 and 7, for example. Such sharing may employ a direct communication from the sharing network element to the recipient(s), and may employ a broadcast communication protocol such as, for example, Dedicated Short Range Communication (DSRC) (e.g., IEEE 802.11p), discussed above. The method may then proceed to block 906.

At block 906, the network element performing the method may determine whether one or more conditions have been met for the network element to make an autonomous change to a new operational state. For example, the network element may be remotely configured so that when in the "Awaiting Remote S/W Update" state 855, the network element may make an autonomous change to the "Deployed" state 803, when the conditions of having received and installed a certain software update have been met. The elements of a network as described herein may also be configured for other conditions that enable autonomous changes between other pairs of operational states, which may be different from those shown in and discussed above with respect to the example of FIG. 8. If, at block 906, the method determines that one or more conditions have not been met for the network element to make an autonomous change of operational state, the method may then continue at block 918 of FIG. 9B, discussed below. If, however, the method determines that one or more conditions have been met for the network element to make an autonomous change, the method may then continue at block 908, described below.

At block 908, the method may attempt to make an autonomous change to a new operational state for this network element, according to the one or more conditions for which the network element is configured. Next, at block 910, the method may determine whether the network element was able to successfully complete the operational state change. If it is determined that the autonomous operational state change was not successfully completed, the method may proceed to block 916, where the method may share the failure to complete the autonomous change of operational state, with one or more other network elements such as neighboring network elements (e.g., network elements within wireless communication range, their neighbors, or a cloud-based system). The method may then proceed to block 918 of FIG. 9B, described below. If, however, the network element performing the method determines, at block 910, that that the autonomous operational state change was successfully completed then, at block 912, the network element may share news of the successful completion of the autonomous change of operational state, with one or more other network elements such as neighboring or other network elements, and at block 914, may set the current operational state of the network element that has been shared with other network elements, to the new operational state. The method then continues at block 918 of FIG. 9B, described below. It should be note that a network element may have certain operational states, information about which is shared with other network elements, and in addition may have other private, internal, or sub-operational states that are not routinely shared with other elements of the network.

Figure 9A:
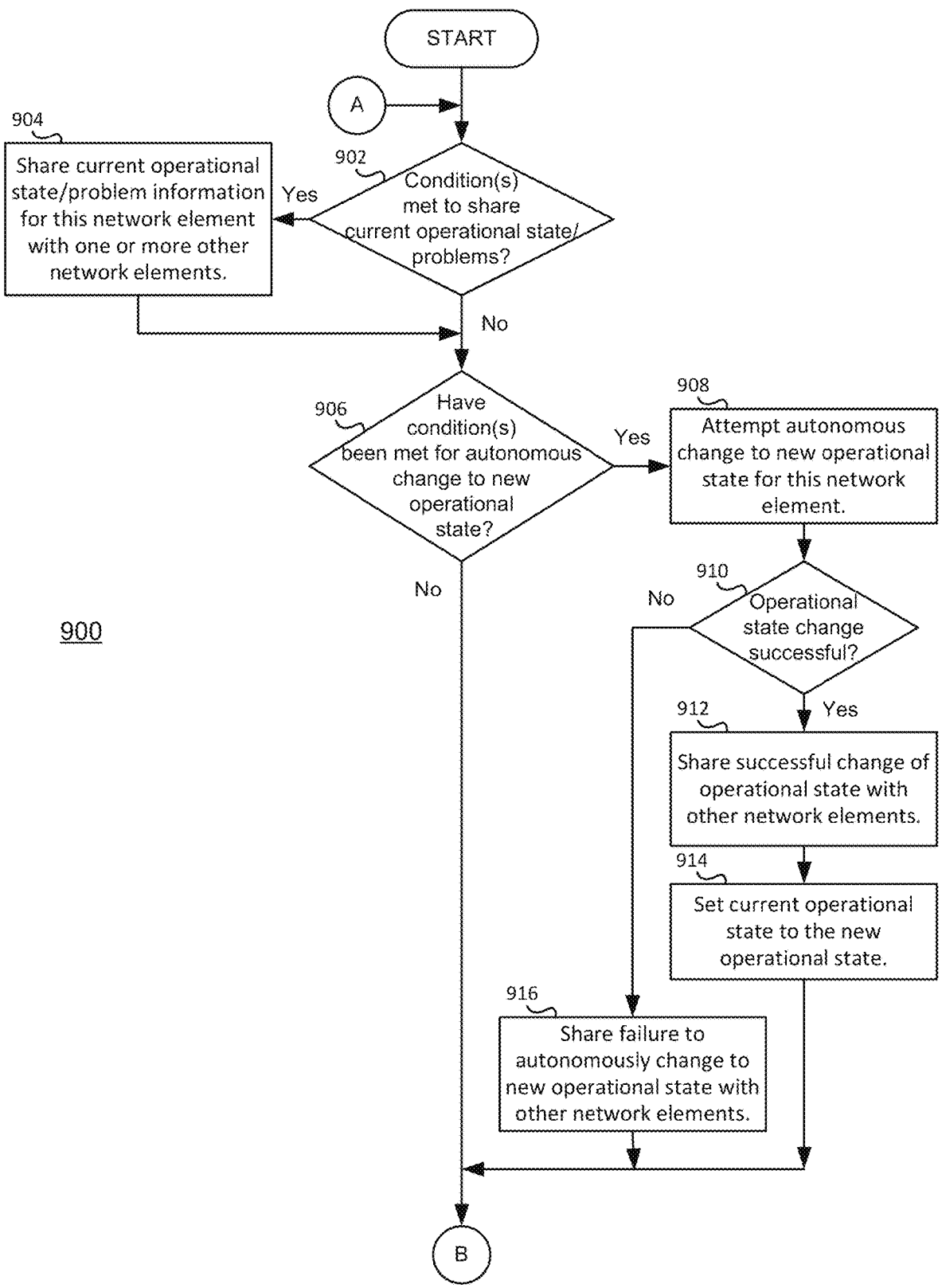
FIGS. 9A-9D show a flowchart that illustrates the actions of an example method of operating a network element (e.g., a network node), in accordance with various aspects of the present disclosure.
Figure 9B:
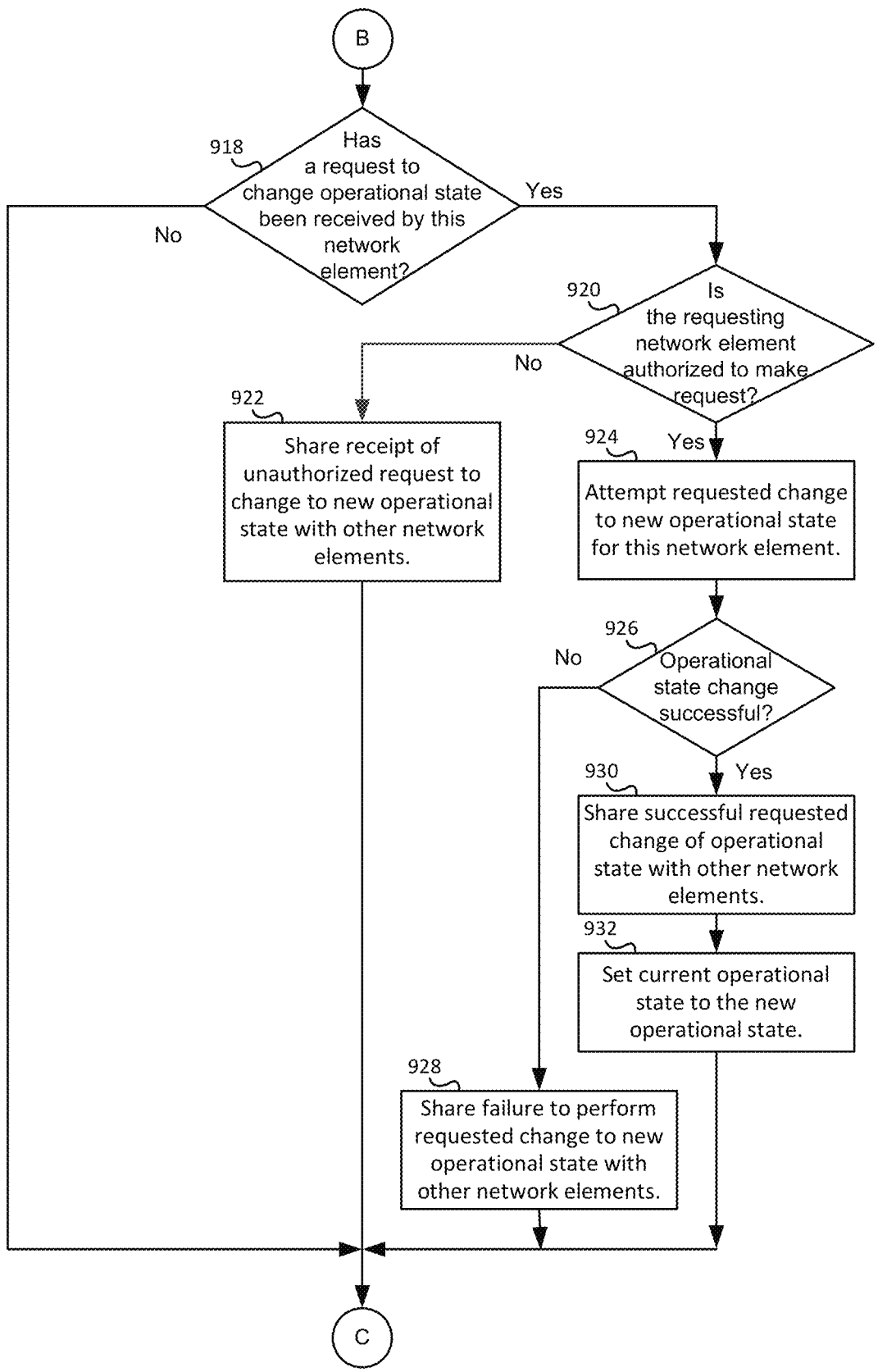

At block 918 of FIG. 9B, the method may determine whether a request to change operational state has been received by the network element performing the method. For example, in accordance with various aspects of the present disclosure, a network element may share operational state/problem information with other elements of the network, and one or more of those other network elements (e.g., a neighboring node, a cloud-based system operating autonomously or with human operator input) may request that a change of the operational state of the sharing network element be made. In addition, in accordance with certain aspects of the present disclosure, a system or client software application may, for example, request a change of operational state of the network element on which the system or client software application is running. For example, a system software application may determine that a software update is available for the network element running the method, and may request that the operational state of the network element be transitioned to "Awaiting Remote S/W Update" state 855 using, for example, an application software interface (API) provided by the system of the network element. Additional information about performing software updates in a method of moving things may be found, for example, in U.S. patent application Ser. No. 15/157,887, titled "Systems and Methods for Remote Software Update and Distribution in a Network of Moving Things." filed on May 18, 2016, the complete subject matter of which is hereby incorporated herein by reference, in its entirety. Other such system and/or client software application requests for change of operational state are also contemplated. If, at block 918, the method determines that a request to change operational state has not been received by the network element, the method may proceed at block 934 of FIG. 9C, described below. If, however, it is determined that a request to change operational state has been received by the network element, the method may continue at block 920, which is described as follows.

At block 920, the method checks whether the network element that requested the change in operational state of the network element is authorized to make such a request. If, at block 920, the method determines that the requesting network element is not authorized, then the method may continue at block 922, where the method may share, with other elements of the network, news of the receipt, by the network element performing the method, of the unauthorized request to change to a new operational state. The method may then continue at block 934 of FIG. 9C, described below. If, however, the method determines, at block 920, that the network element that requested the change in operational state of the network element is authorized to make such a request, the method passes control to block 924, where the network element performing the method attempts to make the requested change in its operational state.

Next, at block 926, the method determines whether the attempted operational state change of block 924 was successful. If the operational state change attempted at block 924 was not successful, the method proceeds to block 928, where the network element may share news of the failure to perform the operational state change with other elements of the network. The method then continues at block 934 of FIG.

9C, described below. If, however, the method of FIGS. 9A-9D determines, at block 926, that the operational state change attempted at block 924 was successful, the method continues at block 930, where the network element performing the method is directed to share news of the successful change of operational state with other elements of the network, and then to block 932, to set the current operational state of the network element to the new operational state. The method then passes control to block 934 of FIG. 9C, described below.

Figure 9C:
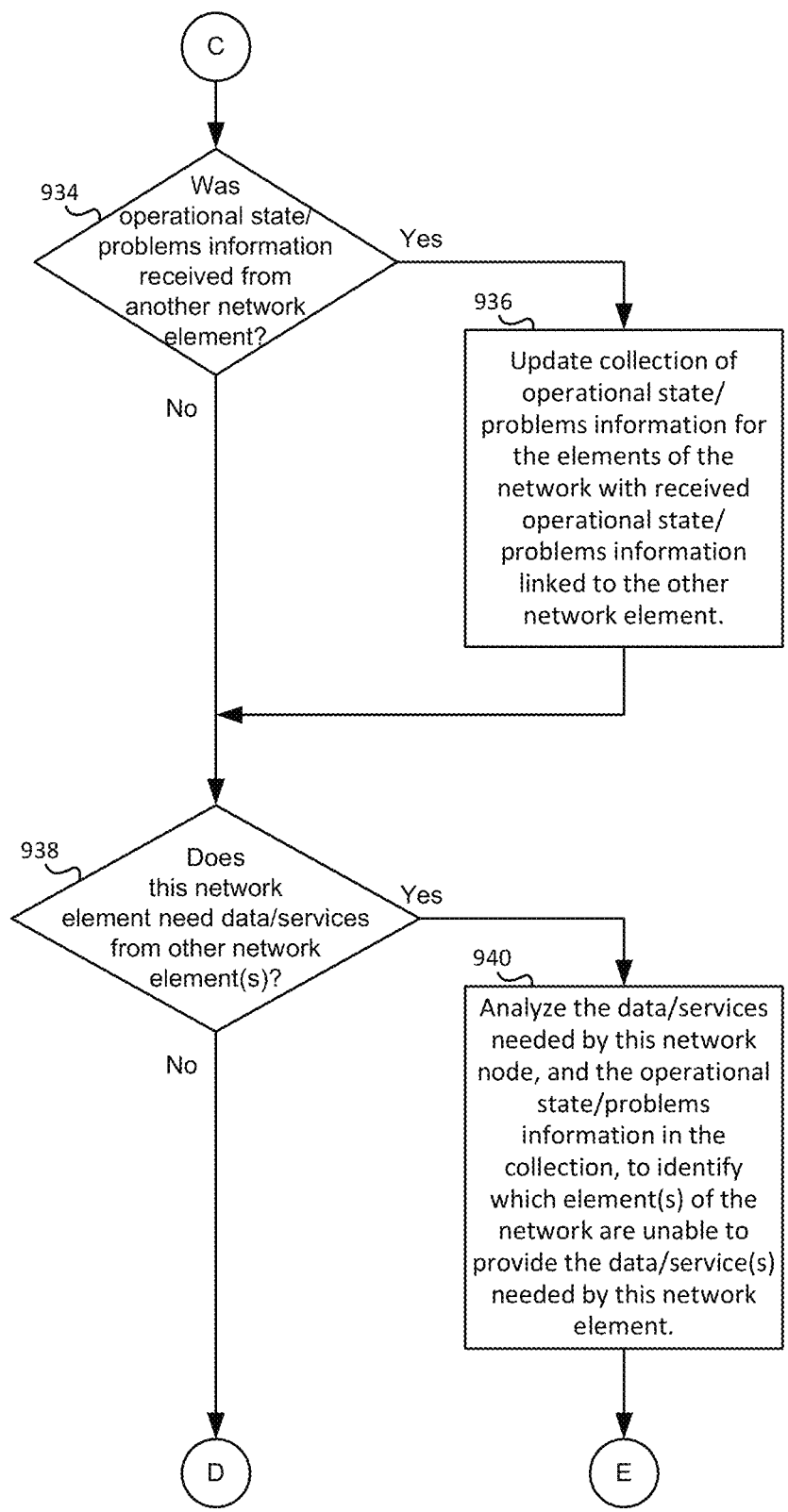
Figure 9D:
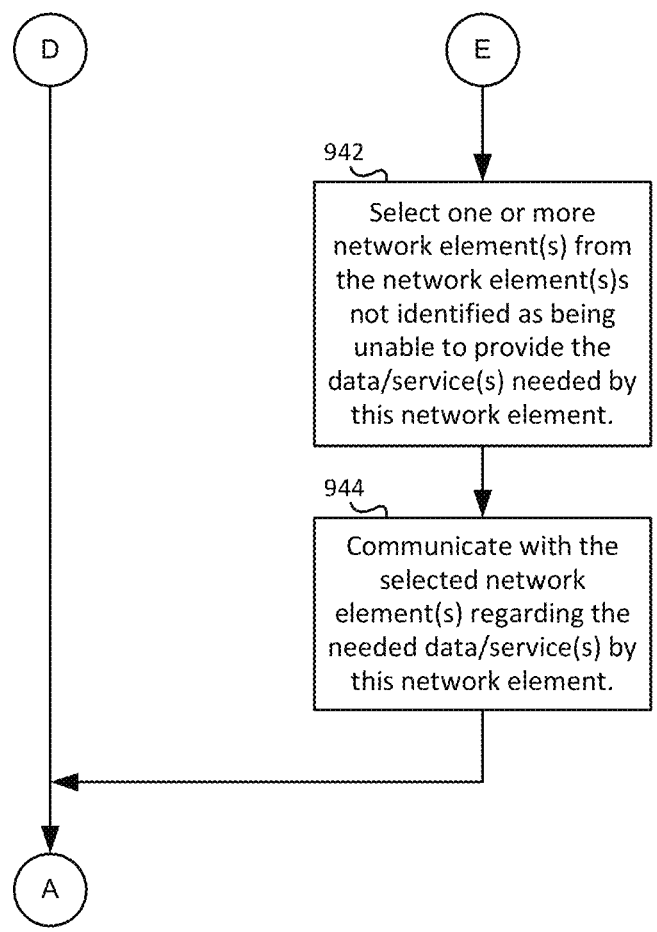

At block 934 of FIG. 9C, a network element performing the method determines whether operational state/problem information has been received from another element of the network. Such a check may be made periodically during operation of the network element, as a network of moving things as described herein may have large numbers of network elements, which may each undergo operational state changes and experience various problems both during the processes of network element assembly, test, distribution, deployment, and maintenance, as well as during the dynamic situations of operation of the network. In accordance with various aspects of the present disclosure, such operational state/problem information may be received from a neighboring network element, via a neighboring network element from another network element, and/or from a cloud-based system such as the Cloud of FIG. 1 or Cloud 760 of FIG. 7. In accordance with some aspects of the present disclosure, such operational state/problem information of network elements may be sent to, and distributed to network elements, by a cloud-based system as described herein. If, at block 934, the method determines that operational state/problem information has not been received from another element of the network, the method may proceed at block 938, described below. If, however, operational state/problem information has been received by the network element performing the method, the method may then update a collection of operational state/problem information for use by the network element performing the method. Such a collection may be maintained locally, at the network element performing the method of FIGS. 9A-9D, or may be accessible at or distributed by a cloud-based system as described herein. The method may then continue at block 938, discussed below.

At block 938, the method of FIGS. 9A-9D may determine whether the network element performing the method needs to access data or services provided by another element of the network of moving things. For example, a network element may need information from another network element (e.g., operational state, geographic location/position/coordinates, what software is present/running on network element, communication capabilities/connectivity of the network element), and/or may need to communicate data to or via another network element (e.g., Internet access, sharing information with other network elements/cloud). If, at block 938, the method determines that the network element performing the method does not currently need to access data or services provided by another element of the network of moving things, the network element performing the method determines that it currently needs to access data or services provided by another element of the network of moving things, the method may proceed to block 940.

In accordance with aspects of the present disclosure, a network element performing the method of FIGS. 9A-9D may have a number of options regarding what other network element(s) to communicate with in making requests for data and/or services, such as the neighboring network elements accessible via one of the wireless communication methodologies described or referred to herein. Before initiating such requests to other network elements, the method may, at block 940, analyze the data/services that are needed and may be requested by the network element performing the method, and the information in the collection of operational state and/or problem information for the elements of the network, to identify which network elements may be/are unable to provide the data and/or service(s) requested by the network element performing the method. For example, a particular network element may need to communicate or access time-sensitive data to/from a cloud-based system, may determine that the particular network element currently has three neighboring network elements (e.g., network elements within direct wireless communication range (e.g., using DSRC)), but may find by analyzing a collection of operational state/problem information gathered from the neighboring network elements, that one of the three neighboring network elements is currently having a problem with the amount of data throughput that it can handle, a situation that the particular network element may recognize as potentially causing a delay in communication of the time-sensitive data that is unacceptable to the particular network element. The particular network element may then, in accordance with aspects of the present disclosure represented at block 942 of FIG. 9D, use such collected information about the operational state/problems of the one or more other network elements, to select one or more network element(s) that were not identified as being unable to provide the data/service(s) needed by the particular network element. The particular network element may then, at block 944, communicate with the selected one or more network elements regarding the data and/or services needed by the particular network element. In this way, elements of a network of moving things as described herein may avoid interacting with network elements that not yet in service, overloaded, impaired, or non-functional, and that may not only be incapable of meeting the needs of the network element needing data or service(s), but may result in loss of data or delays in performing the needed tasks. The method of FIGS. 9A-9D may then return to block 902, described above.

The ever growing volume of information generated by the huge variety of connected devices raises constant challenges in providing reliable transport for that data. Within a few years, with the continued proliferation of the Internet of Things and further deployment of smart sensors, the transportation of the growing volume of data generated by such devices will present a tremendous challenge not only in terms of the amount of bandwidth required, but also with regard to connectivity costs.

A network in accordance with various aspects of the present disclosure, which may be referred to herein as the "Internet of Moving Things" (IoMT), provides a platform that is highly optimized for the transport of data generated by, for example, various sensors in the area served by such a network, in a very scalable way. Additional details regarding interfacing among sensors and a network in accordance with various aspects of the present disclosure may be found, for example, in U.S. Provisional Patent Application No. 62/222,135, entitled "Systems and Methods for Collecting Sensor Data in a Network of Moving Things," filed Sep. 22, 2015. Additional details regarding adapting the granularity, bandwidth, and priority of sensing and disseminating data may be found, for example, in U.S. Provisional Patent Application No. 62/253,249, entitled "Systems and Methods for Optimizing Data Gathering in a Network of Moving Things," filed Nov. 10, 2015. The complete subject matter of each of the above-identified provisional patent applications is hereby incorporated herein by reference, in its respective entirety.

All of the data collected by elements in a network of moving things is potentially valuable for a wide variety of applications and insights, most of which are yet to be discovered. End-to-end data integrity is important in any network, and is particularly so in a network such as the IoMT of the present disclosure, considering the variety of elements and processes involved in its acquisition. At the present time, just a small fraction of the data collected from connected devices is actually being used. However, network support for the collection of high definition data is of increasing importance. A network in accordance with various aspects of the present disclosure provides the foundations for an analytics system that uses collected sensor and other data to provide, for example, optimizations and predictions in a wide variety of different areas (e.g., transportation, environment, and/or communication).

The mobile and dynamic network infrastructure that provides support for a network of moving things such as that described herein may provide an interface for a number of clients/customers/users such as, for example, third-parties that wish to test their own applications, vehicle fleet operators that desire to deploy their own fully-managed services to control and manage their fleets, and telecommunication network (telco) operators that want to expand their infrastructure (e.g., fiber infrastructure, cellular infrastructure, etc.). Because a network of moving things according to various aspects of the present disclosure may be used by a wide variety of different entities and applied for numerous applications and purposes, the operation of such a network may use policies to, for example, control access to the network by each of the clients, and manage the use of the applications that are employed to monitor, diagnose, and survey the status of the network elements and of the network environment. Such software applications that monitor and survey the network include, by way of example and not limitation, software applications that monitor the status of the critical hardware modules and system software applications to enable corrective action can to be taken when abnormal behavior is detected, software applications that monitor network behavior to understand and evaluate how the network is working and to diagnose possible problems, and software applications that perform surveys/studies in the network to gather information from the network to help in deploying and configuring the network in an optimal way.

Execution of such software applications by various network elements may involve access to shared data available in the system (e.g., information about neighboring network elements, information about central processing unit (CPU) load, information characterizing/identifying available sensing, communication, storage, or other technologies of a network element), access to particular sources of information (e.g., Global Navigation Satellite System (GNSS)/Global Positioning System (GPS) receivers, OBD2 information, etc.). Execution of such software applications by network elements may also involve the use of certain levels of resources (e.g., a minimum/desired amount of bandwidth used/needed to send data to, e.g., the Cloud; the amount of memory needed (e.g., disk space, flash memory, random access read/write memory, etc.), and each software application may be assigned a priority that may be used to determine whether the software application should run, or not run, when other software applications having their own assigned priorities are also present on a network element. Each software application may have a different mode of operation (e.g., may use a particular level of resources (e.g., a certain amount of data storage), or may have a certain length sampling period), and in accordance with aspect of the present disclosure may be dynamically configured and adapted on-demand. In addition, such software applications may receive inputs/data from a client/customer/user system external to the network described herein (e.g., using an API accessible, for example, locally or from the Cloud) that may, for example, affect the modes of monitoring/surveying performed by the software application. A network of moving things in accordance with aspects of the present disclosure may decide whether such received inputs/data will be applied or enforced in the network, because more than one external source or entity may provide such inputs/data.

A network of moving things in accordance with various aspects of the present disclosure enables the smooth and harmonized coexistence of a variety of software applications that perform monitoring in a highly dynamic and moving environment based on, for example, the context information of the system itself and also the context of the vehicle(s) on which network elements are located. A network system in accordance with aspects of the present disclosure automatically adapts, for example, the assigned priority, the levels of assigned physical interfaces (PHY)/communication resources, the periods of time that the software application is active and inactive (e.g., turn-on/turn-off), the modes of operation of the software application, and the status of each monitoring application. Such a system may adapt the granularity, sampling period, type of data, and the resources used by different monitoring applications, and may prioritize software applications that perform monitoring and surveying, one over another, as well as with respect to the client's services and software applications running on a network element (e.g., Internet access, data acquisition, etc.) such as, for example, a mobile AP, fixed AP, or MC. In this manner, a network of moving things in accordance with various aspects of the present disclosure may provide improved handling of the volatility of the resources and high mobility of nodes of the network.

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller, may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

Various aspects of the present disclosure may be found in a method of deploying and controlling elements of a wireless network. Such a wireless network may comprise a plurality of such network elements, and each network element may have a respective current operational state of a plurality of operational states. Such a method may comprise sharing, by a first network element with one or more other network elements of the plurality of network elements, information representative of the current operational state of the first network element; attempting to perform, by the first network element, a change to a new operational state of the first network element; and sharing, by the first network element with the one or more other network elements, information representative of whether the attempt to change to the new operational state was successful. The method may also comprise maintaining a collection of information representative of the respective current operational state of each of the one or more other network elements, received by the first network element; and selecting a third network element from the one or more other network elements, to which to communicate a request, by the first network element, to provide particular data or a particular service to the first network element, based on the collection of information representative of the respective current operational state of each of the one or more other network elements and the particular data or the particular service. The method may also comprise communicating the request to provide the particular data or the particular service, to the selected third network element.

In accordance with aspects of the present disclosure, the information representative of a current operational state of the first network element may comprise information identifying at least one operational problem at the first network element; and the plurality of network elements may comprise one or more fixed access points at respective fixed geographic positions and one or more mobile access points that are movable about a geographic area served by the wireless network. The one or more fixed access points and the one or more mobile access points wirelessly may share respective current geographic positions with other network elements of the wireless network. The attempt to perform the change to the new operational state of the first network element may be autonomously initiated by the first network element; and the attempt to perform the change to the new operational state of the first network element may be initiated by the second network element. Selecting may comprise determining the ability of each network element of the one or more other network elements to provide the particular data or the particular service according to requirements of the first network element, based on the collection of information representative of the current operational state of each of the one or more other network elements; and choosing the third network element from those network elements that are determined to be able to provide the particular data or the particular service. The particular data may comprise information identifying one or more running software applications, and the particular service may comprise a service providing access to the Internet. The plurality of operational states may comprise a first operational state representing a network element that is awaiting an update to software of the network element; a second operational state representing a network element that is available only for use by members of a specific group of users of the wireless network, but that is unavailable to those users of the wireless network not in the specific group; and a third operational state representing a network element that is deployed within the service area of the wireless network and that is available to serve any users of the wireless network.

Additional aspects of the present disclosure may be seen in a non-transitory computer-readable medium having stored thereon a plurality of code sections, where each code section may comprise a plurality of instructions executable by one or more processors to cause the one or more processors to perform a method of deploying and controlling elements of a wireless network. Such a wireless network may comprise a plurality of such network elements, each network element may have a respective current operational state of a plurality of operational states, and such a method may comprise the actions of the method described above.

Further aspects of the present disclosure may be observed in a system for deploying and controlling elements of a wireless network. Such a wireless network may comprise a plurality of such network elements, and each network element may have a respective current operational state of a plurality of operational states. Such a system may comprise one or more processors operably coupled to storage for storing instructions executable by the one or more processors and operably coupled to at least one wireless interface for communicating with other network elements. The one or more processors may be operable to, at least, perform the actions of a method such as the method described above.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A method of deploying and controlling elements of a wireless network comprising a plurality of such network elements, each network element having a respective current operational state of a plurality of operational states, the method comprising:

sharing, by a first network element with one or more other network elements of the plurality of network elements, information representative of the current operational state of the first network element;

attempting to perform, by the first network element, a change to a new operational state of the first network element;

sharing, by the first network element with the one or more other network elements, information representative of whether the attempt to change to the new operational state was successful;

maintaining a collection of information representative of the respective current operational state of each of the one or more other network elements, received by the first network element;

selecting a third network element from the one or more other network elements, to which to communicate a request, by the first network element, to provide particular data or a particular service to the first network element, based on the collection of information representative of the respective current operational state of each of the one or more other network elements and the particular data or the particular service; and communicating the request to provide the particular data or the particular service, to the selected third network element;

wherein the plurality of operational states comprises:

a first operational state representing a network element that is awaiting an update to software of the network element;

a second operational state representing a network element that is available only for use by members of a specific group of users of the wireless network, but that is unavailable to those users of the wireless network not in the specific group; and a third operational state representing a network element that is deployed within the service area of the wireless network and that is available to serve any users of the wireless network.

2. The method according to claim 1, wherein the information representative of a current operational state of the first network element comprises information identifying at least one operational problem at the first network element.

3. The method according to claim 1, wherein the plurality of network elements comprises one or more fixed access points at respective fixed geographic positions and one or more mobile access points that are movable about a geographic area served by the wireless network.

4. The method according to claim 3, wherein the one or more fixed access points and the one or more mobile access points wirelessly share respective current geographic positions with other network elements of the wireless network.

5. The method according to claim 1, wherein the attempt to perform the change to the new operational state of the first network element is autonomously initiated by the first network element.

6. The method according to claim 1, wherein the attempt to perform the change to the new operational state of the first network element is initiated by a second network element.

7. The method according to claim 1, wherein selecting comprises:

determining the ability of each network element of the one or more other network elements to provide the particular data or the particular service according to requirements of the first network element, based on the collection of information representative of the current operational state of each of the one or more other network elements; and choosing the third network element from those network elements that are determined to be able to provide the particular data or the particular service.

8. The method according to claim 1, wherein the particular data comprises information identifying one or more running software applications, and the particular service comprises a service providing access to the Internet.

9. A non-transitory computer-readable medium having stored thereon a plurality of code sections, each code section comprising a plurality of instructions executable by one or more processors to cause the one or more processors to perform a method of deploying and controlling elements of a wireless network comprising a plurality of such network elements, each network element having a respective current operational state of a plurality of operational states, the method comprising:

sharing, by a first network element with one or more other network elements of the plurality of network elements, information representative of the current operational state of the first network element;

attempting to perform, by the first network element, a change to a new operational state of the first network element;

sharing, by the first network element with the one or more other network elements, information representative of whether the attempt to change to the new operational state was successful;

maintaining a collection of information representative of the respective current operational state of each of the one or more other network elements, received by the first network element;

selecting a third network element from the one or more other network elements, to which to communicate a request, by the first network element, to provide particular data or a particular service to the first network element, based on the collection of information representative of the respective current operational state of each of the one or more other network elements and the particular data or the particular service; and communicating the request to provide the particular data or the particular service, to the selected third network element;

wherein the plurality of operational states comprises:

a first operational state representing a network element that is awaiting an update to software of the network element;

a second operational state representing a network element that is available only for use by members of a specific group of users of the wireless network, but that is unavailable to those users of the wireless network not in the specific group; and a third operational state representing a network element that is deployed within the service area of the wireless network and that is available to serve any users of the wireless network.

10. The non-transitory computer-readable medium according to claim 9, wherein the information representative of a current operational state of the first network element comprises information identifying at least one operational problem at the first network element.

11. The non-transitory computer-readable medium according to claim 9, wherein the plurality of network elements comprises one or more fixed access points at respective fixed geographic positions and one or more mobile access points that are movable about a geographic area served by the wireless network.

12. The non-transitory computer-readable medium according to claim 11, wherein the one or more fixed access points and the one or more mobile access points wirelessly share respective current geographic positions with other network elements of the wireless network.

13. The non-transitory computer-readable medium according to claim 9, wherein the attempt to perform the change to the new operational state of the first network element is autonomously initiated by the first network element.

14. The non-transitory computer-readable medium according to claim 9, wherein the attempt to perform the change to the new operational state of the first network element is initiated by a second network element.

15. The non-transitory computer-readable medium according to claim 9, wherein selecting comprises:

determining the ability of each network element of the one or more other network elements to provide the particular data or the particular service according to requirements of the first network element, based on the collection of information representative of the current operational state of each of the one or more other network elements; and choosing the third network element from those network elements that are determined to be able to provide the particular data or the particular service.

16. The non-transitory computer-readable medium according to claim 9, wherein the particular data comprises information identifying one or more running software applications, and the particular service comprises a service providing access to the Internet.

17. A system for deploying and controlling elements of a wireless network comprising a plurality of such network elements, each network element having a respective current operational state of a plurality of operational states, the system comprising
one or more processors operably coupled to storage for storing instructions executable by the one or more processors and operably coupled to at least one wireless interface for communicating with other network elements, the one or more processors operable to, at least:
share, by a first network element with one or more other network elements of the plurality of network elements, information representative of the current operational state of the first network element;
attempt to perform, by the first network element, a change to a new operational state of the first network element;
share, by the first network element with the one or more other network elements, information representative of whether the attempt to change to the new operational state was successful;
maintain a collection of information representative of the respective current operational state of each of the one or more other network elements, received by the first network element;
select a third network element from the one or more other network elements, to which to communicate a request, by the first network element, to provide particular data or a particular service to the first network element, based on the collection of information representative of the respective current operational state of each of the one or more other network elements and the particular data or the particular service; and
communicate the request to provide the particular data or the particular service, to the selected third network element;
wherein the plurality of operational states comprises:
a first operational state representing a network element that is awaiting an update to software of the network element;
a second operational state representing a network element that is available only for use by members of a specific group of users of the wireless network, but that is unavailable to those users of the wireless network not in the specific group; and
a third operational state representing a network element that is deployed within the service area of the wireless network and that is available to serve any users of the wireless network.

18. The system according to claim 17, wherein the information representative of a current operational state of the first network element comprises information identifying at least one operational problem at the first network element.

19. The system according to claim 17, wherein the plurality of network elements comprises one or more fixed access points at respective fixed geographic positions and one or more mobile access points that are movable about a geographic area served by the wireless network.

20. The system according to claim 19, wherein the one or more fixed access points and the one or more mobile access points wirelessly share respective current geographic positions with other network elements of the wireless network.

21. The system according to claim 17, wherein the attempt to perform the change to the new operational state of the first network element is autonomously initiated by the first network element.

22. The system according to claim 17, wherein the attempt to perform the change to the new operational state of the first network element is initiated by a second network element.

23. The system according to claim 17, wherein selecting comprises:
determining the ability of each network element of the one or more other network elements to provide the particular data or the particular service according to requirements of the first network element, based on the collection of information representative of the current operational state of each of the one or more other network elements; and
choosing the third network element from those network elements that are determined to be able to provide the particular data or the particular service.

24. The system according to claim 17, wherein the particular data comprises information identifying one or more running software applications, and the particular service comprises a service providing access to the Internet.

\* \* \* \* \*